(12) United States Patent
Bonerb

(10) Patent No.: US 12,240,417 B1
(45) Date of Patent: Mar. 4, 2025

(54) VEHICLE CARGO SYSTEM FOR HAULING BULK MATERIALS AND PERSONAL PROPERTY

(71) Applicant: Timothy Bonerb, Rye Beach, NH (US)

(72) Inventor: Timothy Charles Bonerb, Rye Beach, NH (US)

( * ) Notice: Subject to any disclaimer, the term of this patent is extended or adjusted under 35 U.S.C. 154(b) by 21 days.

(21) Appl. No.: 18/402,820

(22) Filed: Jan. 3, 2024

(51) Int. Cl.
B60R 9/06 (2006.01)

(52) U.S. Cl.
CPC ..................... B60R 9/06 (2013.01)

(58) Field of Classification Search
CPC ........................................... B60R 9/06
USPC ................................. 414/462–466
See application file for complete search history.

(56) References Cited

U.S. PATENT DOCUMENTS

| | | | | |
|---|---|---|---|---|
| 4,718,812 A | * | 1/1988 | Smalley | B60P 1/4442 296/61 |
| 5,316,432 A | * | 5/1994 | Smalley | A61G 3/068 280/166 |
| 10,266,123 B1 | * | 4/2019 | Faynor | B60R 9/06 |
| 11,400,850 B1 | * | 8/2022 | Curtis, III | B66F 9/18 |
| 2003/0113196 A1 | * | 6/2003 | O'Leary | B60R 9/06 414/462 |
| 2006/0045677 A1 | * | 3/2006 | Garfield | A45C 13/385 414/800 |
| 2008/0206030 A1 | * | 8/2008 | Reuille | B60P 3/07 254/362 |
| 2009/0028679 A1 | * | 1/2009 | Smith | B60P 1/4421 414/800 |
| 2018/0043835 A1 | * | 2/2018 | Ehlers | B60R 9/06 |
| 2019/0152406 A1 | * | 5/2019 | Shaw | B60R 9/10 |

* cited by examiner

*Primary Examiner* — Lynn E Schwenning

(57) ABSTRACT

The concept includes a vehicle cargo rack having interchangeable containers and material handling attachments to interface and fit to a cargo frame to safely transport a wide variety of cargoes such as dry and wet bulk materials such as grass clippings, yard waste, dirt and mulch as well as piece goods such as luggage, tools, food, sports equipment, bicycles and other miscellaneous items.

29 Claims, 26 Drawing Sheets

VEHICLE CARGO SYSTEM FOR HAULING BULK MATERIALS AND PERSONAL PROPERTY

BACKGROUND

Loading, transporting and emptying dry bulk materials such as dirt, mulch, grass clippings and other materials with a passenger vehicle can be very challenging. It's typically attempted by using small containers, garbage cans, garbage bags, cardboard boxes and the like. Even when professional landscapers employ the use of expensive and heavy dump inserts installed in their pick up trucks and/or dump trailers, the process is labor intensive, awkward and exposes workers to injuries and hazards. When using a vehicle for hauling personal property like ski's, a wheelchair, bicycles or a scooter, the cargo carriers are highly specialized and expensive and tailored for each specific piece of equipment.

SUMMARY OF THE INVENTION

In one aspect, a cargo system includes a lift frame, a cargo frame configured to interface with the lift frame, a container attached to the cargo frame for handling bulk materials or personal property that can be attached to a passenger or work vehicle via a tow bar hitch.

In another aspect, a cargo frame with a container attached can easily and quickly be separated form the lift frame and rest on a relatively flat surface such as a lawn and be filled with about 500 pounds of yard waste and/or landscape materials before it is attached to a vehicle equipped with a lift frame lift. The lift frame is equipped with a motorized cable lift assembly capable of retrieving the cargo frame and container unit resting on the ground and while lifting the cargo frame and container is able to self-center and maintain it in a horizontal position so it interfaces correctly and can lock onto to the lift frame for transport.

In yet another aspect, the cable lift assembly on the lift frame is equipped with a load cell for limiting how much weight can be picked up as well as a scale to weigh the cargo to make sure it is safe for the vehicle to handle.

In another aspect, the cable lift assembly located from near the top of the lift frame is equipped with two cables, each equipped with a cable fastener such as a caribiner, can be extended as the bottom of the cargo frame remains attached is able to pivot on the lift frame once the rear wall panel is opened so that the cargo frame and container unit can be dumped for emptying the container.

In yet another aspect, the cargo frame can be equipped with a wide variety of fixtures for handling almost any type of cargo from luggage, sports equipment such as snowboards, ski's, surfboards, tools, a wheelchair, motorcycle or even a bales of hay.

In another aspect, the cargo frame can be attached to a weather tight container equipped with wheels capable of transporting many suitcases, clothes and other personal property while traveling which can be quickly and safely offloaded from the lift frame on the vehicle and rolled into a hotel in in a single container in one trip.

DESCRIPTION OF DRAWINGS

Figure 1:
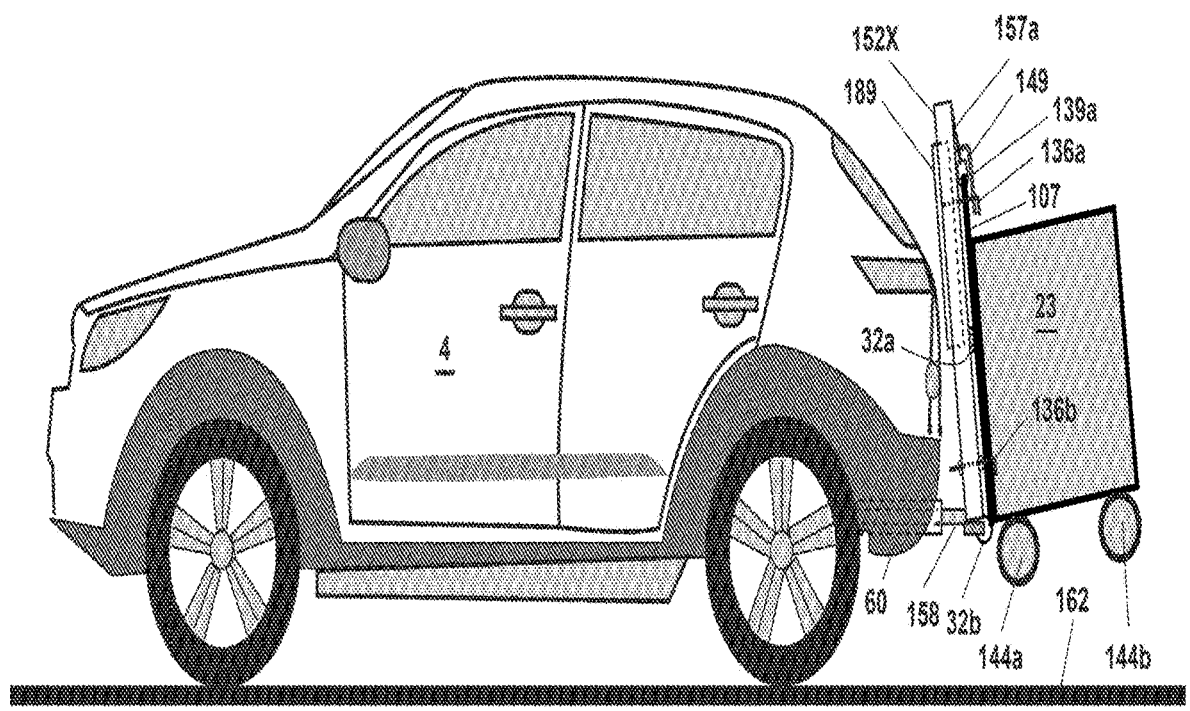
FIG. 1 is a side view that illustrates an example of a cargo system attached to a vehicle.

FIG. 1 is a side view of a car 4 equipped with a lift frame assembly 152X attached via a tow bar tongue 158 inserted in a tow bar bracket 60. As shown, a container 23 is fastened to a cargo frame 107 which fits to and interfaces with the lift frame assembly 152X. While the cargo frame 107 is attached to and interfaces with the lift frame assembly 152X, lift cables 157a and 157b (not shown) from control enclosure 189 are attached to cargo frame 107 for lifting, holding and lowering the container 23 for pick up, transport and delivery functions. Also, as shown, wheels 144a, 144b and 144c (not shown) and 144d (not shown) are attached to the container 23 to provide movement of the container 23 to and from the car 4. For example, when the container 23 may be loaded with several suitcases and other personal items (not shown), the container 23 can easily be moved from the vehicle 4 directly to a hotel room. The container 23 may be made of rigid and weather proof materials such as fiberglass, metal, plastic or even wood, but may also be made of a weather proof PVC coated fabric because of its light weight, durability and low cost.

Figure 2:
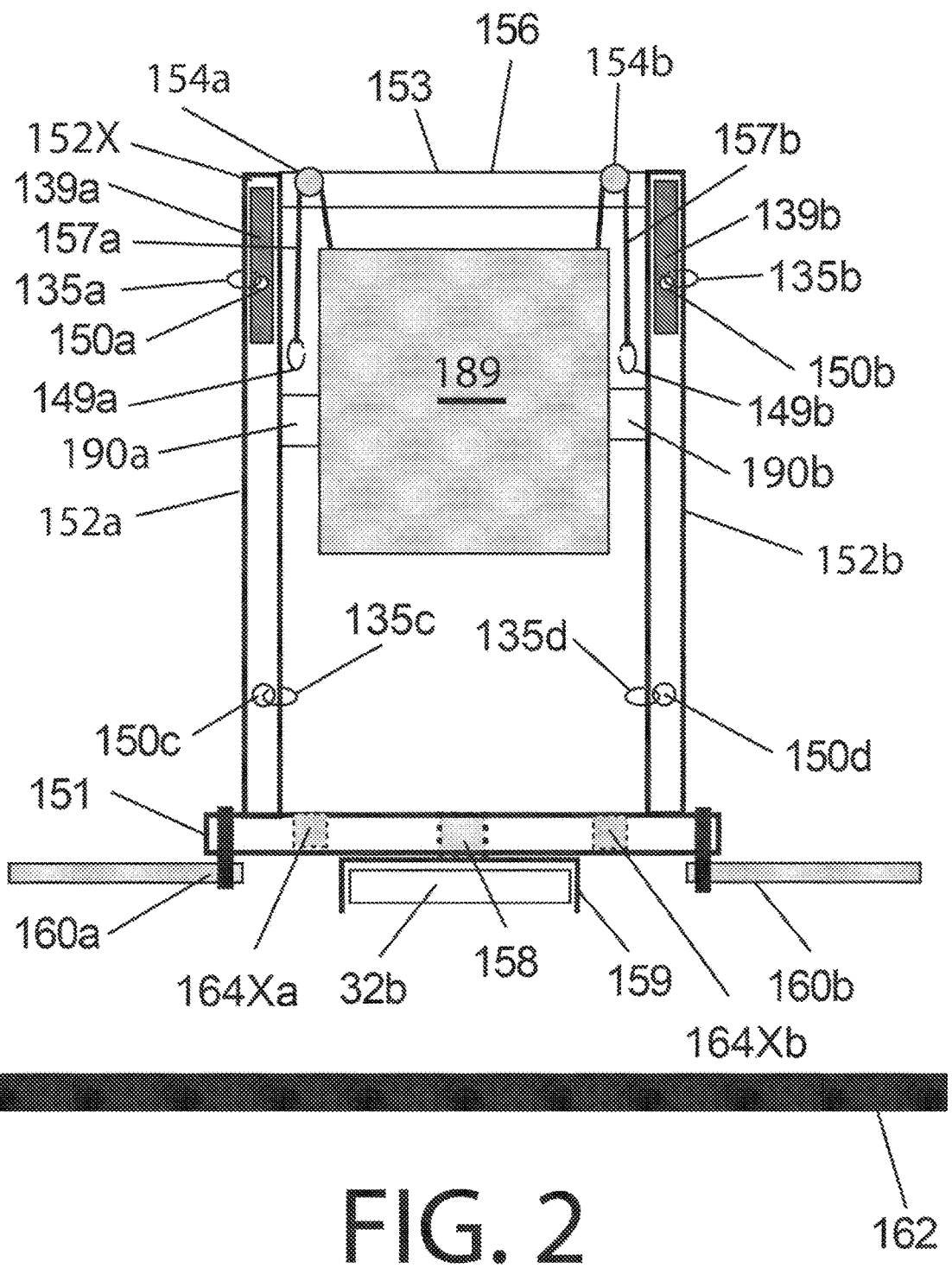
FIG. 2 is a front view that illustrates an example of the frame components of the cargo system.

FIG. 2 is an front view of the lift frame assembly 152X with lift frame supports 152a and 152b fixed to lift frame base 151 and secured on top via lift frame top support 153. Also shown is tow bar tongue 158 secured to lift frame base 151. Lock holes 150a and 150b are located on lift frame support 152a and lock holes 150c and 150d are located on lift frame support 152b. Located between the lift frame assembly 152X supports 152a and 152b are enclosure supports 190a and 190b which hold control enclosure 189. The lift cables 157a and 157b extend out of the control enclosure 189 and upward around lift frame pulleys 154a and 154b. The lift cables 157a and 157b are fitted with cable fasteners 149a and 149b respectively for attaching to cargo frame 107 (not shown). Safety flanges 139a and 139b are fixed to lift frame supports 152a and 152b respectively that can secure the cargo frame 107 (not shown) so that it can't move from side to side and outward once it is fully raised and locked in the transport mode. For an added level of safety and security, lift frame locks 135a, 135b, 135c and 135d may be attached to lock holes 150a, 150b, 150c and 150d respectively to secure the cargo frame 107 (not shown) to lift frame assembly 152X. Also, bottom safety bar assemblies 160a and 160b are fixed to lift frame base 151 so they swivel in and out. Once the cargo frame 107 (not shown) is loaded and secured on lift frame assembly 152X, bottom safety bars 160a and 160b can be rotated outward and under the cargo frame 107 (not shown) for an even higher level of safety. The bottom roller 32b is secured to lift frame base 151 in case contents of the container 23, which may be made of a flexible material such as PVC coated fabric, bulges in or out. Also shown are lock holes 164Xa and 164Xb (not shown) provided in the lift frame base 151 to anchor and hold lock studs 164a and 164b (not shown) of the cargo frame 107 (not shown).

Figure 3:
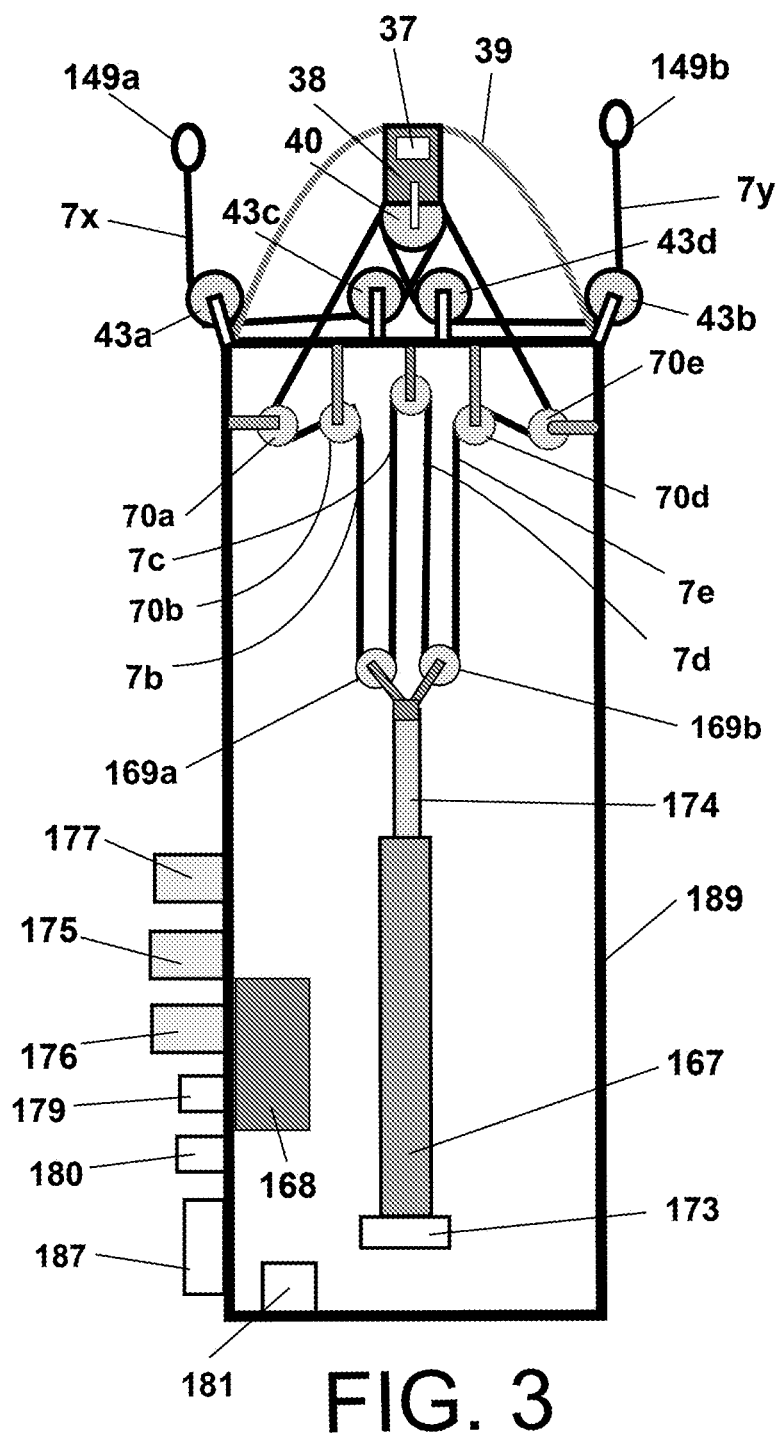
FIG. 3 is a top view of a control enclosure of a lift frame showing a linear actuator and a cable and pulley assembly for lifting and lowering a container from a frame assembly.

FIG. 3 is a top view of the control enclosure 189 of the lift frame assembly 152X (not shown) equipped with various electrical components including a power on/off switch 177, a beeper 176, an up/down switch 175, a motion sensor 179, a light sensor 180, a battery docking station 187, a battery 168, a load cell 173, a linear actuator 167 and a scale display 37 (not shown). Also shown are the lifting and mechanical components including a cable 7, linear actuator pulleys 169a and 169b connected to a linear actuator extension 174, fixed pulleys 70a, 70b, 70c, 70d and 70e, secured to control enclosure 189, scale guide pulleys 43a, 43b, 43c and 43d as well as a scale pulley 40 equipped to a scale support 39. Notice cable ends 7x and 7y of the cable 7 are equipped with cable fasteners 149a and 149b which may be attached to a cargo frame 107 (not shown). Because of the different types of cargo the container 23 may handle, different sizes, shapes and types of the container(s) 23 may be offered. Some container(s) 23 may be wide and deep and used for heavy loads of cargo which may be bulk material such as sand, salt, dirt and stone. For example, bulk cargo 41 (not shown) such as dirt or stone, which is often an unbalanced load (one side of the container 23 is heavier than the other side), two cable(s) 7X and 7Y help prevent cargo frame 107 and container 23 (not shown) attached from tipping when lifting and lowering causing cargo frame 107 not to seat properly between safety flanges 139a and 139b (not shown) on the lift frame assembly 152X. The use of multiple cables 7 such as cable end 7x and cable end 7y allow a wide variety of unbalanced cargo(s), enables the cargo frame 107 (not shown) to be raised and lowered safely and in a horizontal and level position. By using linear actuator pulleys 169a and 169b that move in conjunction with pulleys 70a, 70b, 70c, 70d and 70e which are fixed, a type of block and tackle assembly provides a mechanical lifting advantage as well as a reduced need for a linear actuator 167 with a much longer stroke length. As the linear actuator 167 (which may use a 12V or 120V electric source), moves about 4 inches, sections of cables 7b, 7c, 7d and 7e also move 4 inches for a combined length of cable movement of 16 inches. While almost any vehicle 4 can be equipped with a tow bar bracket 60 (not shown), each vehicle 4 has certain towing and or weight limits that should be adhered to for safe operation. As shown, a scale 38 is attached to a scale support 39 which may be used to weigh cargo(s) on cables 7x and 7y via the weight placed on a scale pulley 40 that is hanging down via gravity and connected to the scale 38. In this configuration, the operator can read a scale display 37 of the scale 38 and change the weight of a load accordingly. The scale 38 also allows an operator to weigh the amount of the cargo, less the weight of the container 23 and cargo frame 107, when purchasing and transporting cargo(s) such as bulk feed for animals. In addition to the scale 38 to make sure the lift frame assembly 152X (not shown) and vehicle 4 is not overloaded, the linear actuator 167 can be equipped with a load cell 173 that may also measure the weight of a cargo as well as to preset limits on the load cell 173 whereby if an overload condition exits, the linear actuator 173 may be programmed to automatically shut off. The feature to weigh loads that the scale 38 and the load cell 173 offer will help the operator to safely manage cargo(s) being transported on lift frame assembly 152X and help avoid any other liabilities and/or damage that might result from transporting a cargo that is deemed to be too heavy and unsafe for the operator's vehicle 4 to handle. Any type of the scale 38, such as a mechanical or digital unit may be used. With regard to a motion sensor 179 and/or a light sensor 180, these devices can be located on or inside the container 23 and wired to an alarm 181 to warn the operator of a problem and or a possible theft. While these devices are wired together as part of the control enclosure 189, they can also be programmed and used to send a signal to a cell phone or computer. For example, if an operator of a vehicle 4 had their family's luggage in the container 23 on a lift frame assembly 152X parked overnight at a motel while traveling, the motion sensor 178 and/or light sensor 180 could immediately send an alarm message to the operator's cell phone.

Figure 4:
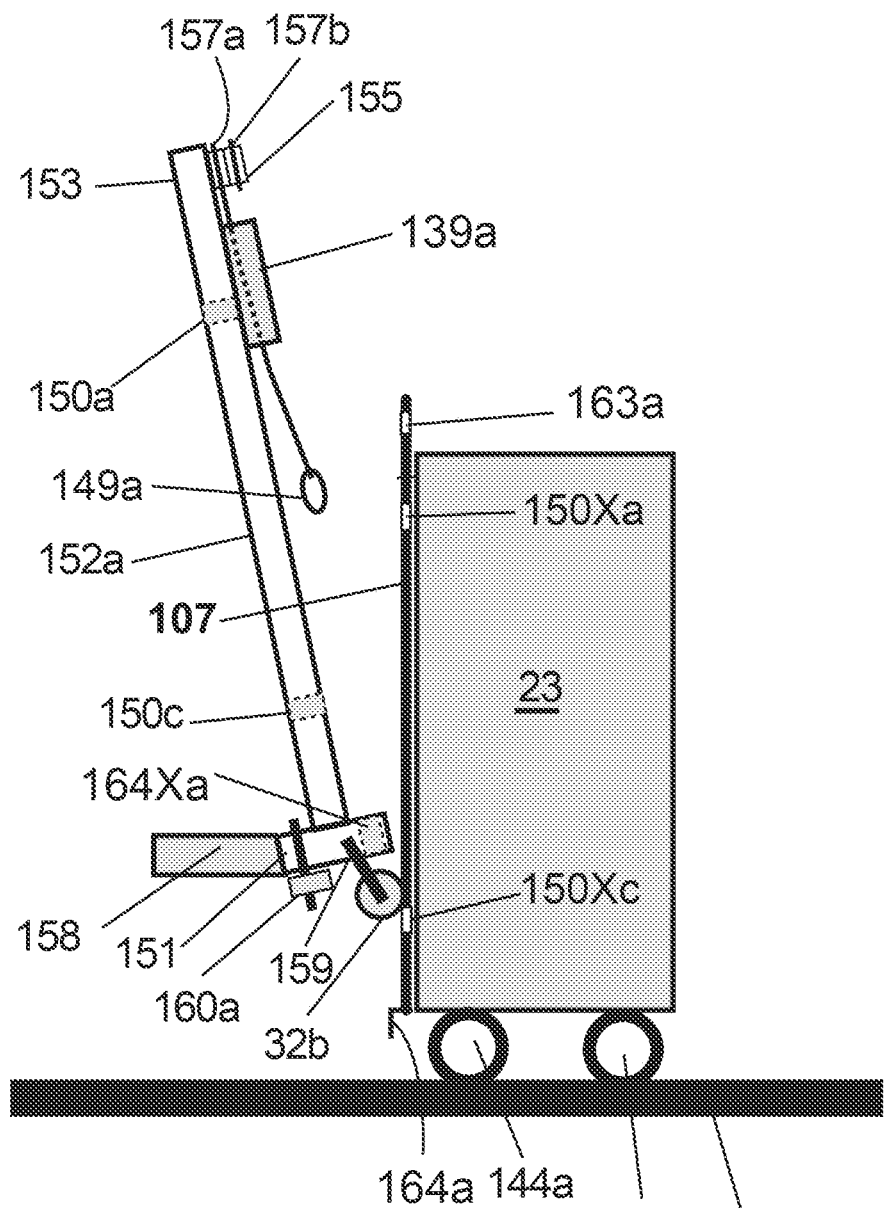
FIG. 4 is a side view of a frame with a container positioned next to the lift frame.
Figure 5:
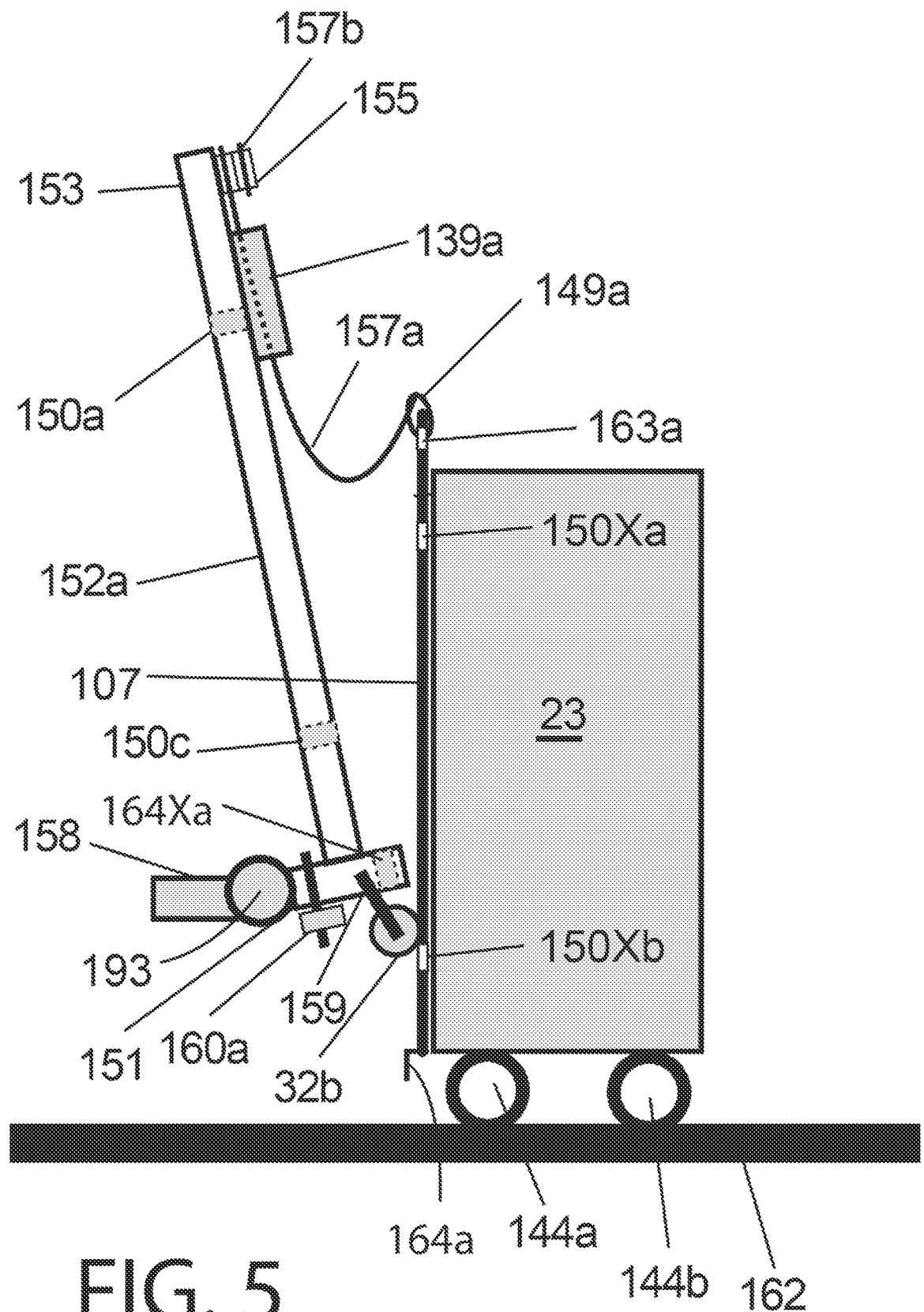
FIG. 5 is a side view of a frame with a container attached to the lift frame via lift cables.
Figure 6:
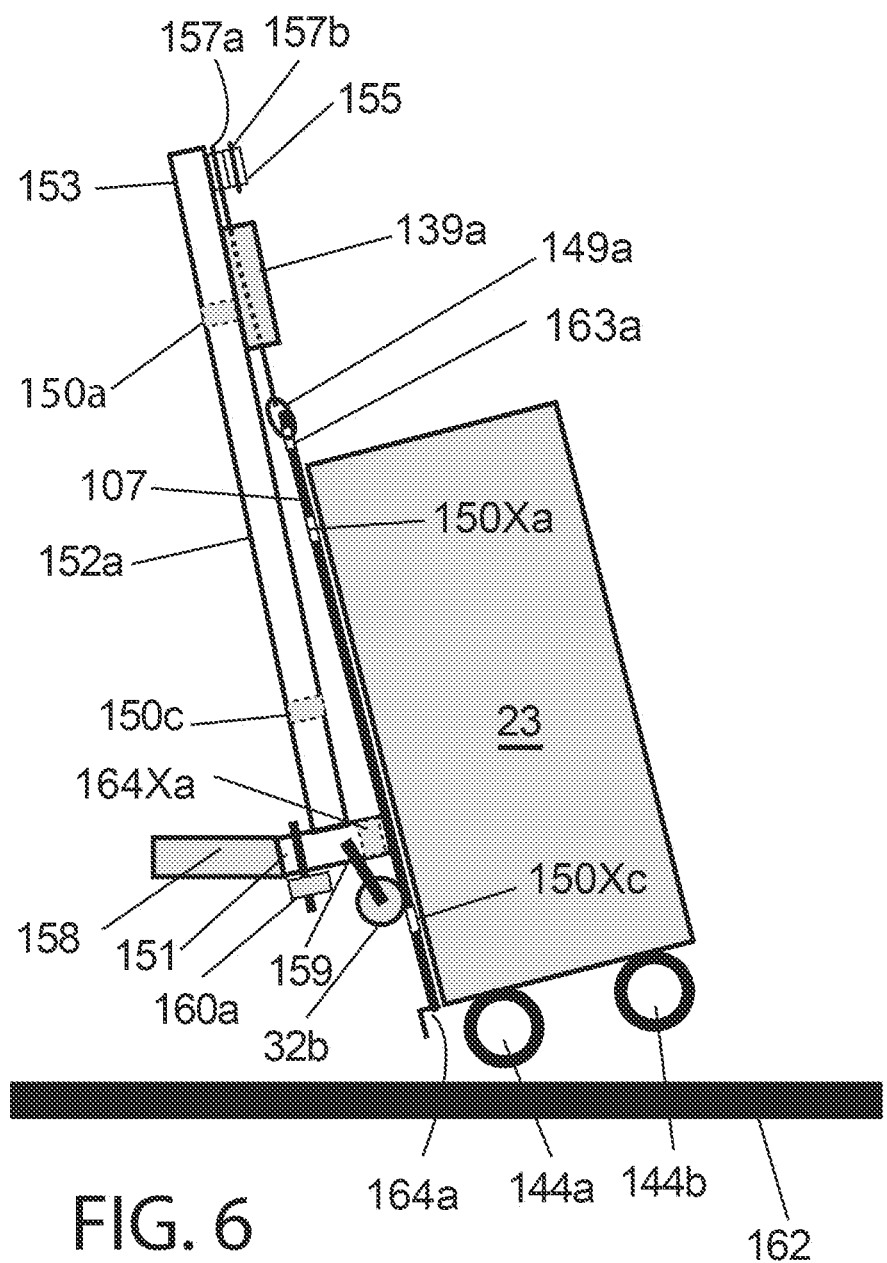
FIG. 6 is a side view of a frame with a container being lifted off the ground onto lift frame via lift cables.
Figure 7:
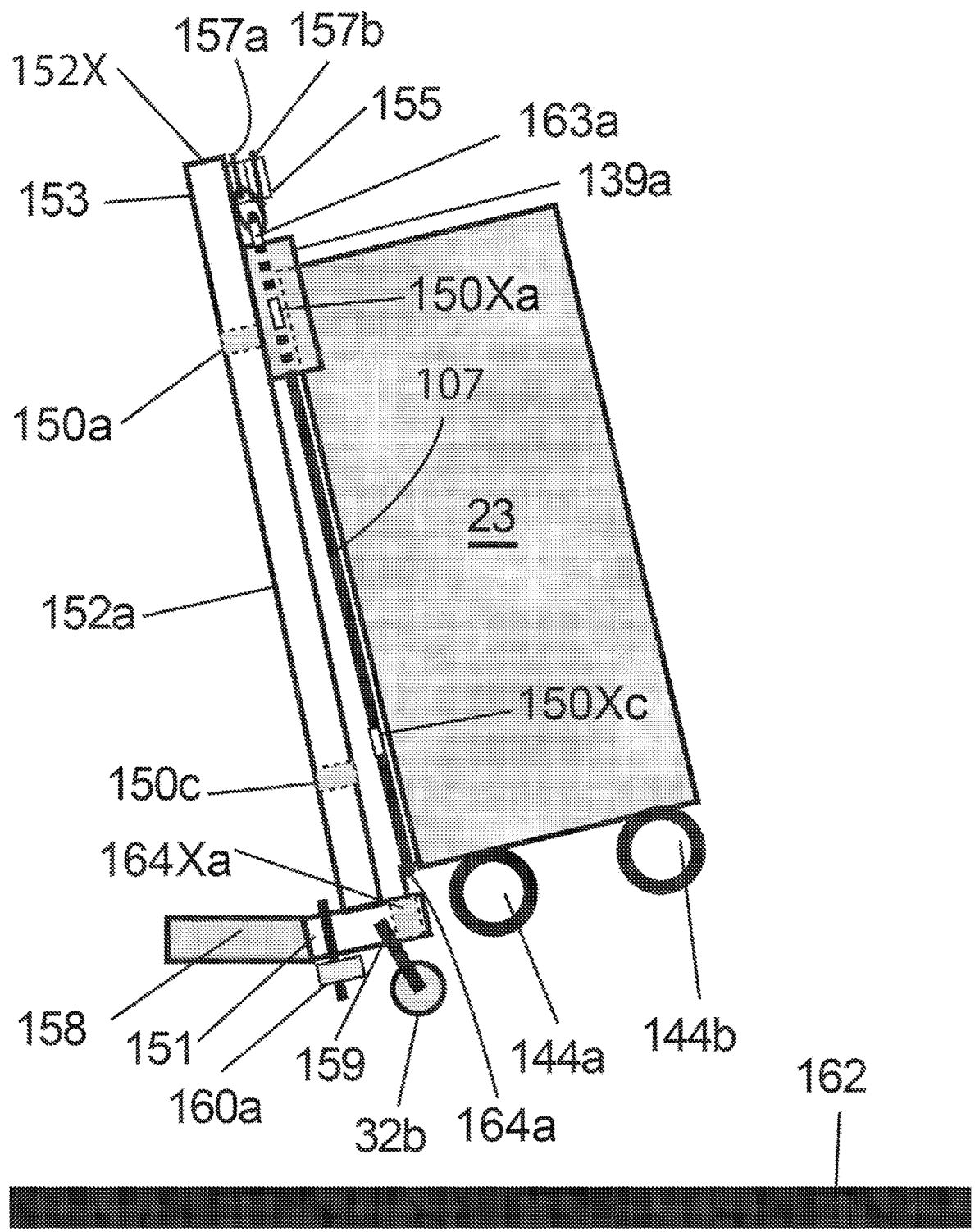
FIG. 7 is a side view of a frame with a container lifted to the very top of the lift frame via lift cables.
Figure 8:
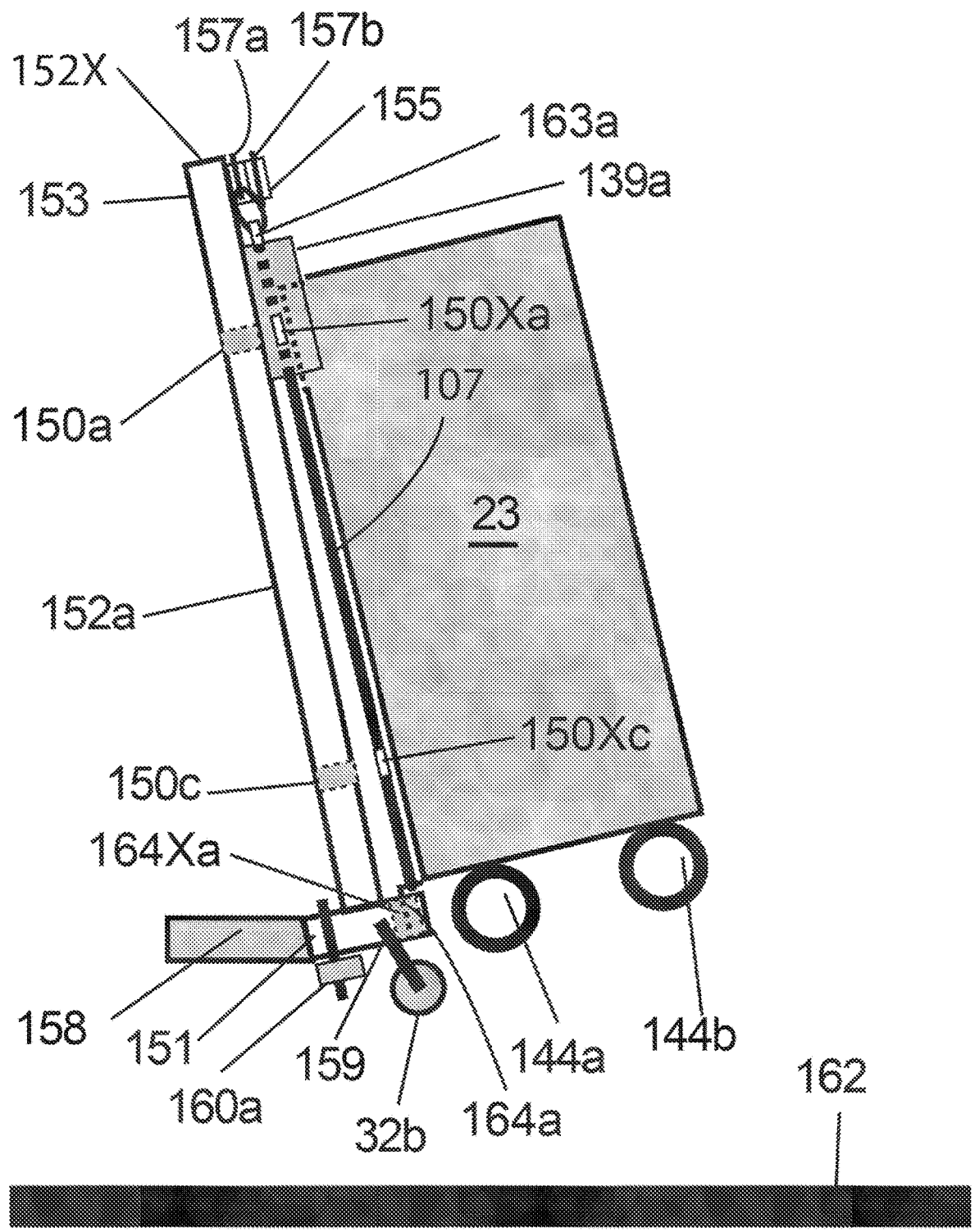
FIG. 8 is a side view of a frame with a container lowered slightly on lift frame via lift cables to lock bottom of frame with a container to the bottom of lift frame.
Figure 9:
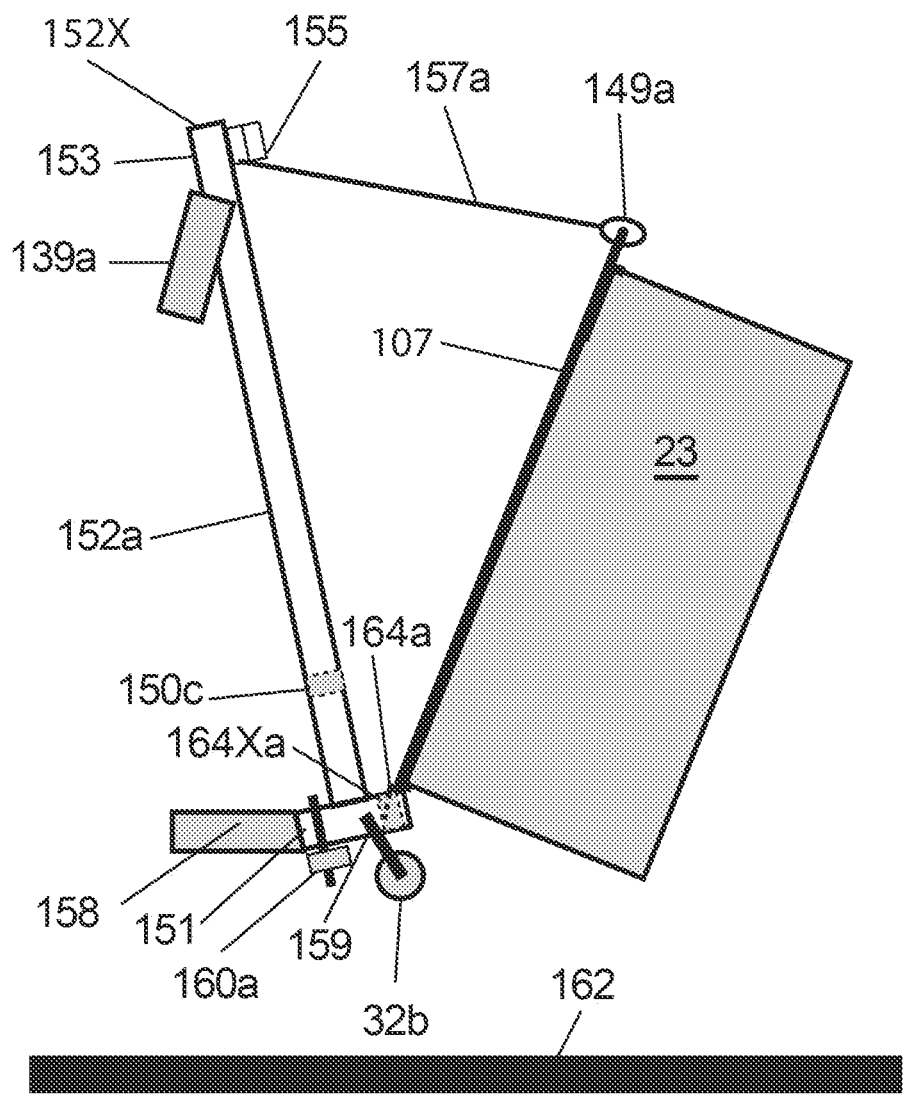
FIG. 9 is a side view of a frame with a container secured to a lift frame via locking pins.

FIGS. 4, 5, 6, 7, 8 and 9 are side views of the cargo frame 107 with the container 23 attached about to be loaded onto the lift frame assembly 152X from the ground 162. In FIG. 4, the cargo frame 107 first comes in contact with a roller 32b fixed to a lift frame base 151 of the lift frame assembly 152X. In FIG. 5, lift cable 157a is attached to lift hole 163a on the cargo frame 107 as well as the lift cable 157b (not shown) being connected to the lift hole 163b (not shown) on the cargo frame 107. The lift frame assembly 152X may be positioned vertically or angled towards the vehicle 4 (not shown) via an angle coupling 193 which is positioned and fixed between the tow bar tongue 158 and lift frame base 151 which moves its center of gravity closer to the vehicle 4. In FIG. 6, the cargo frame 107 and the container 23 are lifted slightly via linear actuator 167 (not shown) as the lift cables 157a and 157b pull upwards until wheels 144a and 144b (144c and 144d not shown) are raised above ground 162. Also, notice that as the cargo frame 107 moves upward from the ground 162, the lock studs 164a and 164b (not shown) fixed to the bottom of the cargo frame 107 will come in contact and easily ride over roller 32b. In FIG. 7, as the cargo frame 107, equipped with container 23, moves up and under safety flanges 139 and 139b (not shown) attached to the lift frame assembly 152X high enough so that the lock studs 164a and 164b (not shown) may be inserted into the lock holes 164Xa and 164Xb (not shown) when lowered slightly to hold cargo frame 107 tightly against the lift frame assembly 152X. As shown in FIG. 8, once the cargo frame 107 is lowered slightly, the lock studs 164a and 164b (not shown) are contained within the lock holes 164Xa and 164Xb (not shown) creating a tight and secure attachment. In FIG. 9, as safety flanges 139a and 139b (not shown) are loosened from lift frame supports 152a and 152b (not shown) and moved to the side, the cargo frame 107 and the container 23 are able to tilt backwards and safely pivot because lock studs 164a and 164b (not shown) are contained in the lock holes 164Xa and 164Xb (not shown). As shown, as lift cables 157a and 157b (not shown) are extended from the lift frame dual pulley 155, the cargo frame 107 and the container 23 can assume a dumping position.

Figure 10:
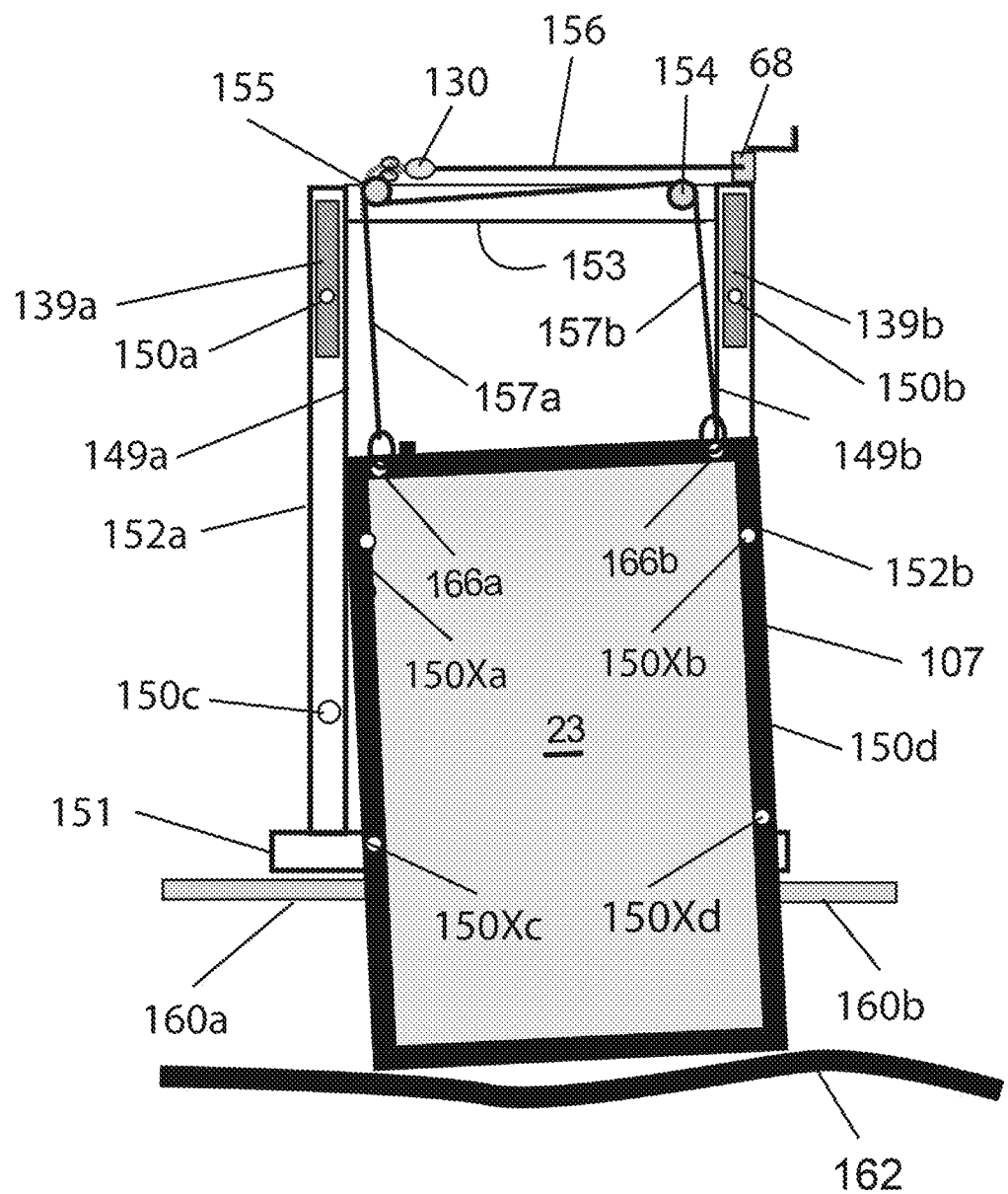
FIG. 10 is a front view of a frame with a container resting on the ground positioned off center to lift frame with lift cables attached.
Figure 11:
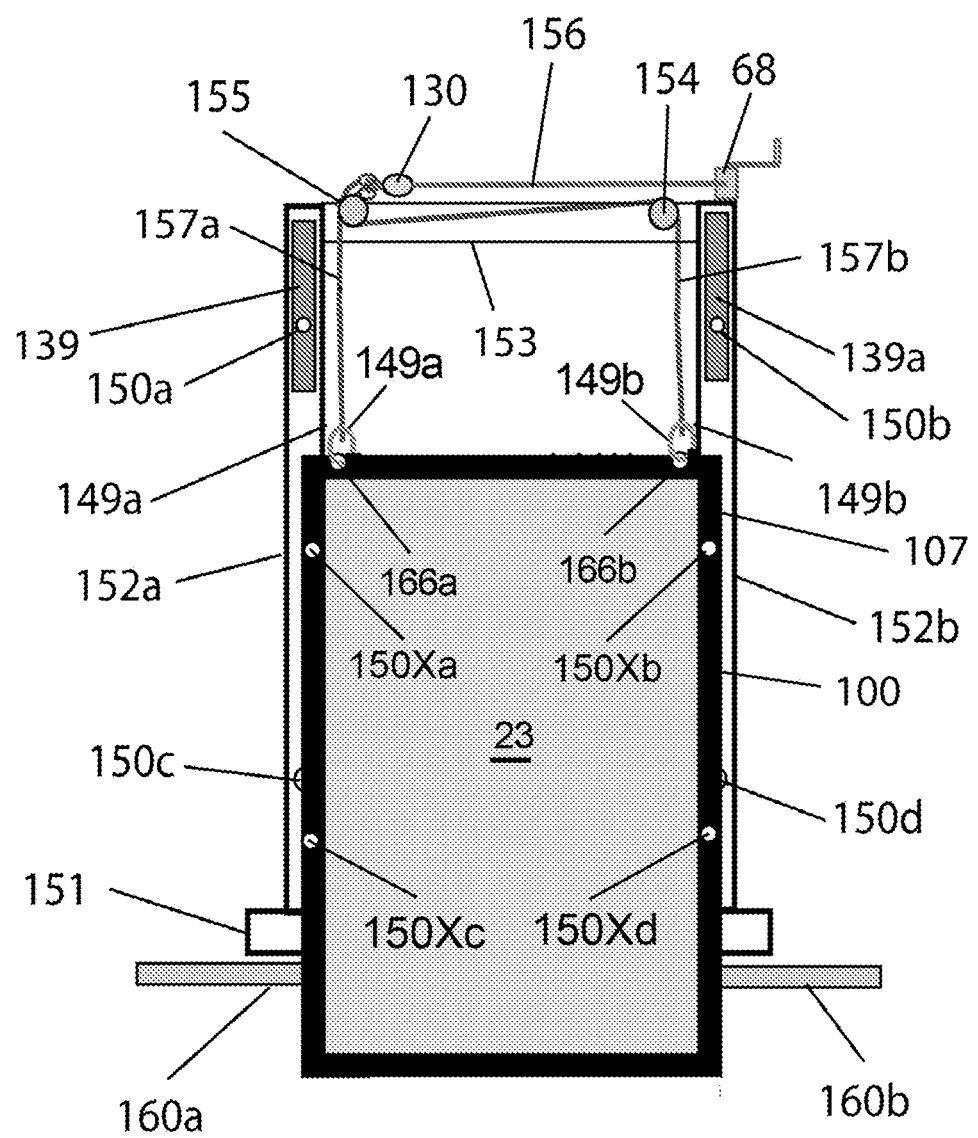
FIG. 11 is a front view of a frame with a container partially lifted off the a cart and the ground via two lift cables on lift frame that cause a frame with a container to be centered against lift frame.
Figure 12:
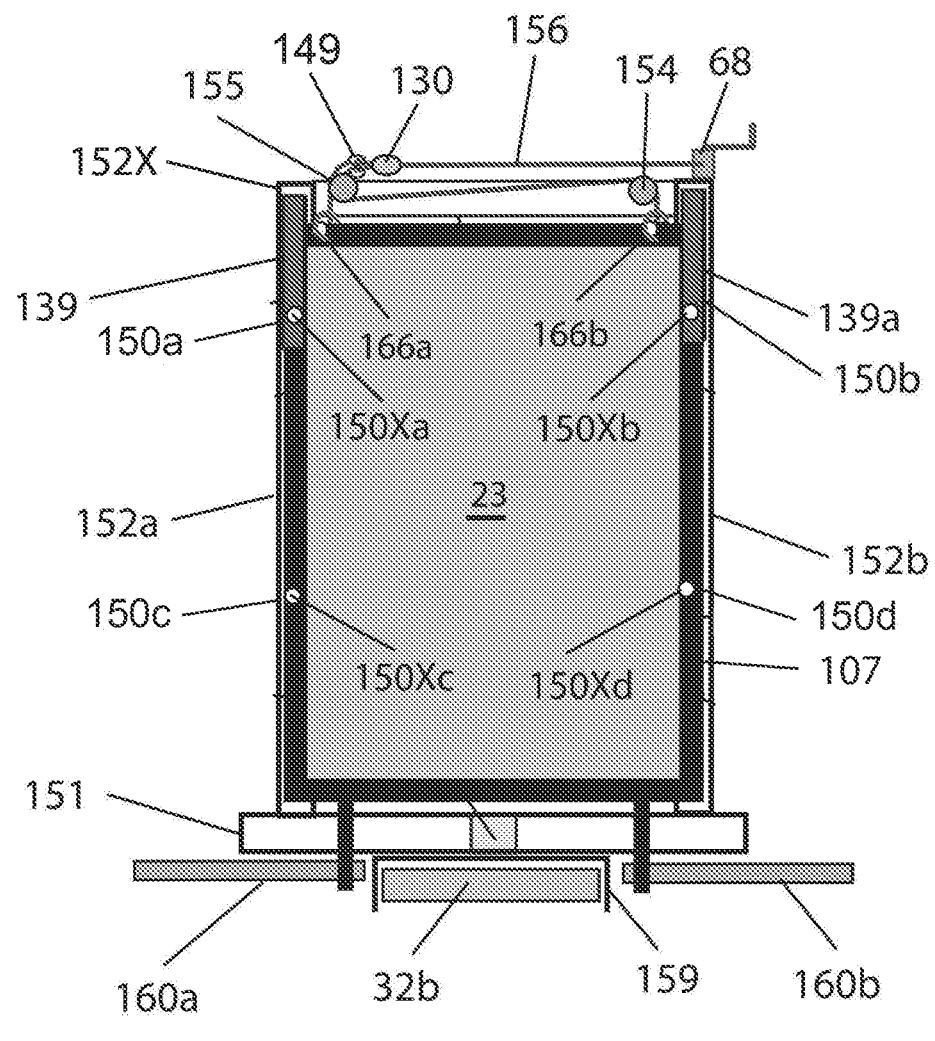
FIG. 12 is a front view of a frame with a container lifted to the top of a lift frame via a winch and two cables.

FIGS. 10, 11 and 12 are front views showing the loading process of the cargo frame 107 onto lift frame assembly 152X from uneven and partially sloped ground 162. For a variety of applications, it may be difficult to correctly position and center the cargo frame 107 in front of the lift frame assembly 152X. As shown, because the lift cables 157a and 157b are loose and free to move, they can be attached to the cargo frame 107, even if the container 23 has fallen on its side. In FIG. 10, the lift cables 157a and 157b are attached to cargo frame lock holes 166a and 166b of the cargo frame 107 via the cable fasteners 149a and 149b. As shown, a winch 68 (manual or electric) may be used in placed of the linear actuator 167 (not shown), may be used to begin lifting cargo frame 107 and container 23. In FIG. 11, as cargo frame 107 cargo frame 107 begins to center itself and correctly align itself with lift frame assembly 152X as it is lifted off the ground 162. As shown, the winch 68 is equipped with a primary lift cable 156 that is connected to the lift cables 157a and 157b via cable fastener 149a and 149b respectively. From dual lift frame dual pulley 155, the lift cable 157a extends down to and is connected to cargo frame lock 166a on the cargo frame 107 via cable fastener 149a. In a similar manner, the lift cable 157b wraps around lift frame dual pulley 155 and then 157b extends to and around lift frame pulley 154 and then down to the cargo frame lock hole 166b on the cargo frame 107 via the cable fastener 149b. In FIG. 12, top of cargo frame 107 with container 23 attached are raised upward on the lift frame assembly 152X and under and in between safety flanges 139a and 139b. Once in the transport mode, cargo frame 107 can be further secured to lift frame assembly 152X.

Figure 13:
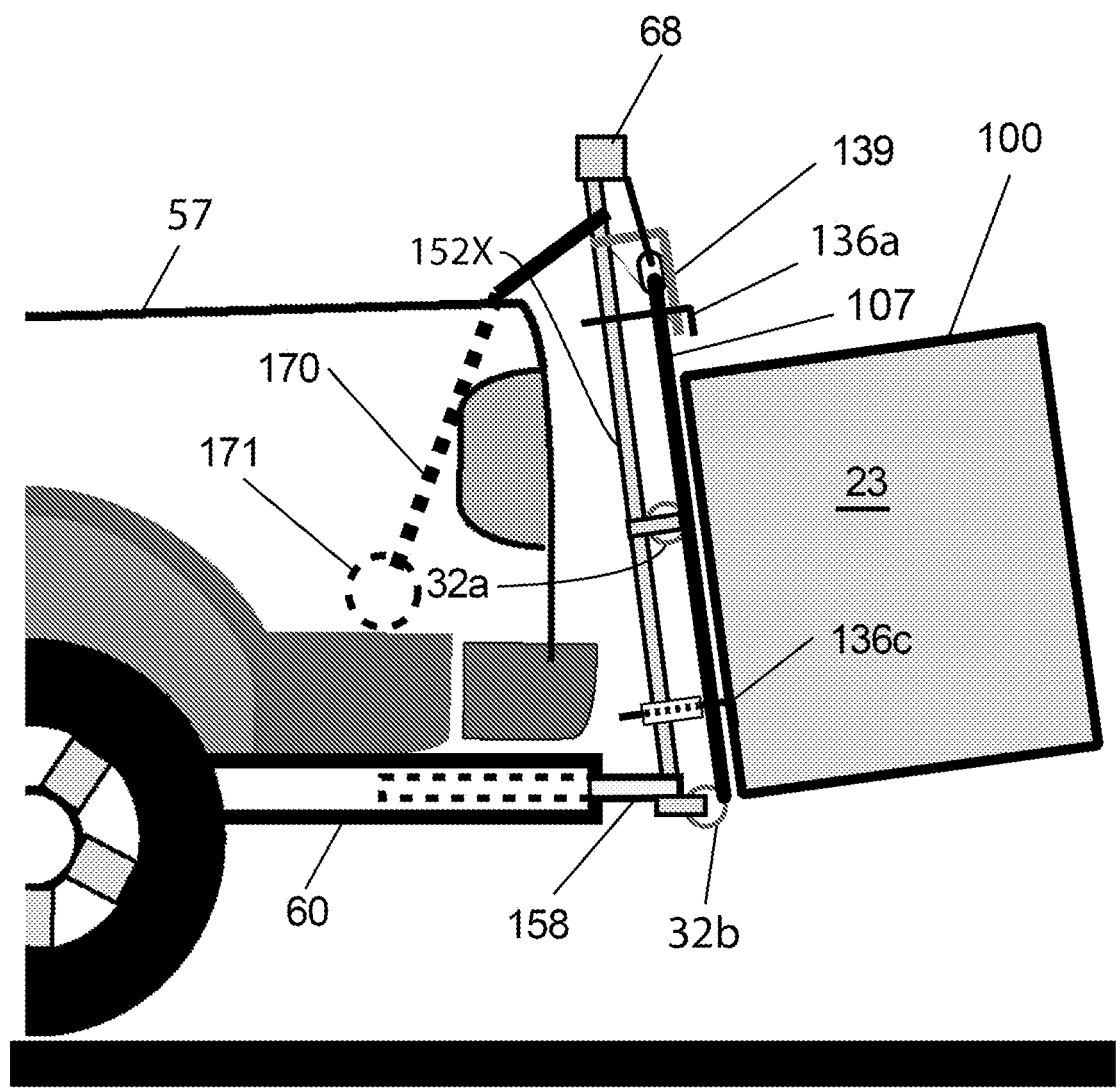
FIG. 13 is a side view of lift frame with a frame with a container mounted to the back of a pick up truck with a support strap from the lift frame to an anchor in the bed of the pick up truck.

FIG. 13 is a side view of lift frame assembly 152X and container 23 secured to truck 57 via cargo strap 170 connected to truck bed anchor 171 for extra support as well as tow bar tongue 158 connection to tow bar bracket 60.

Figure 14:
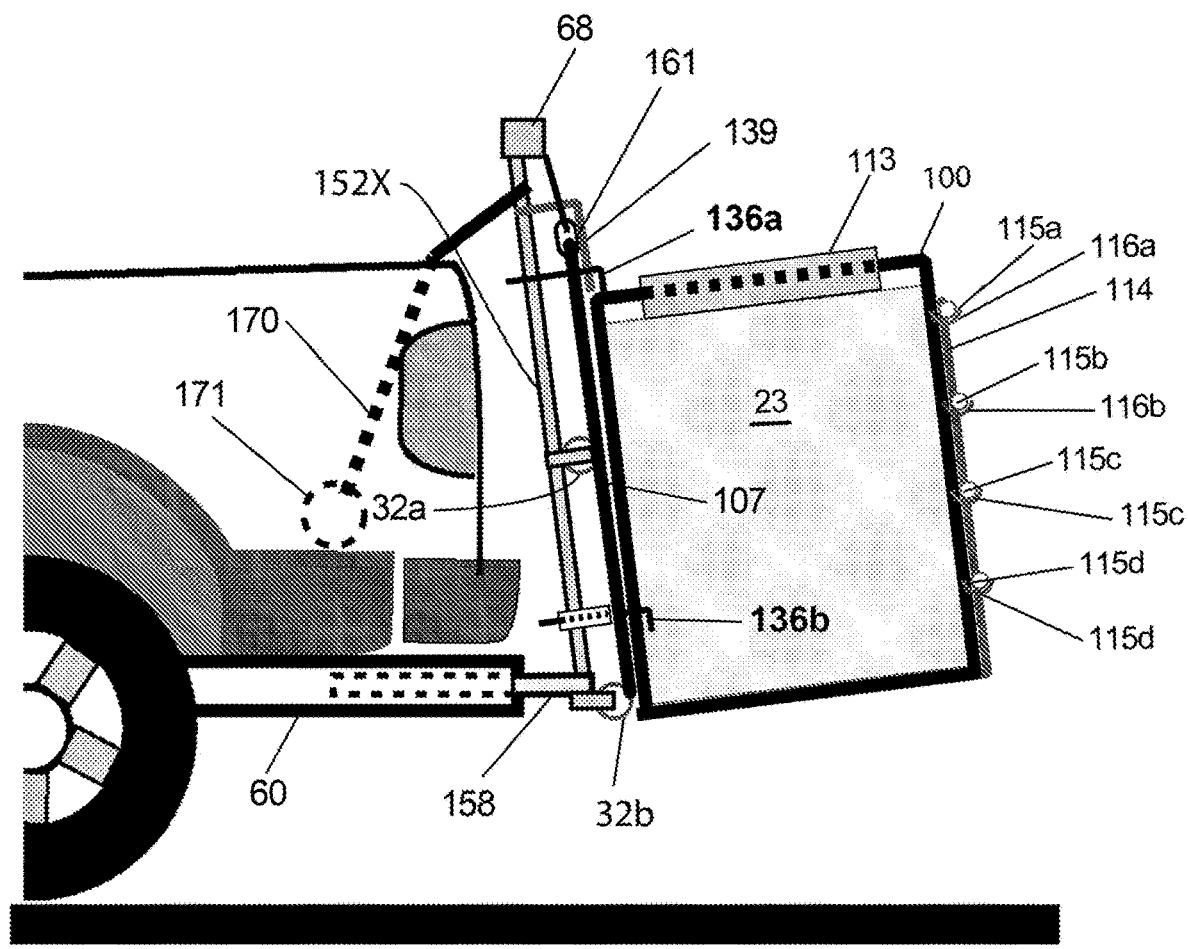
FIG. 14 is a side view of a lift frame attached to a pick up truck via with a container having a flap and anchor assembly to provide a variety of loading positions.
Figure 15:
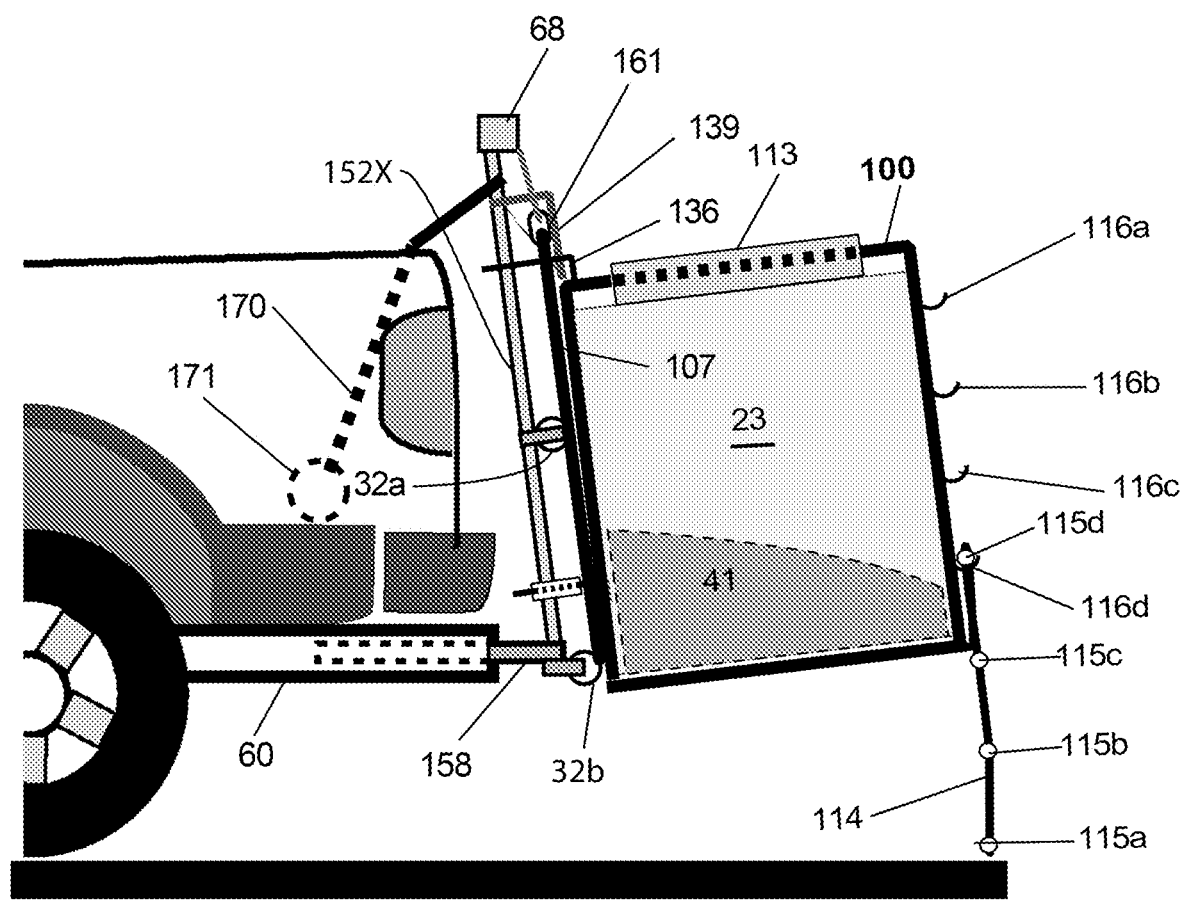
FIG. 15 is a side view of a lift frame with a container and frame attached to a pick up truck with a flap and anchor assembly partially opened to make loading easier.
Figure 16:
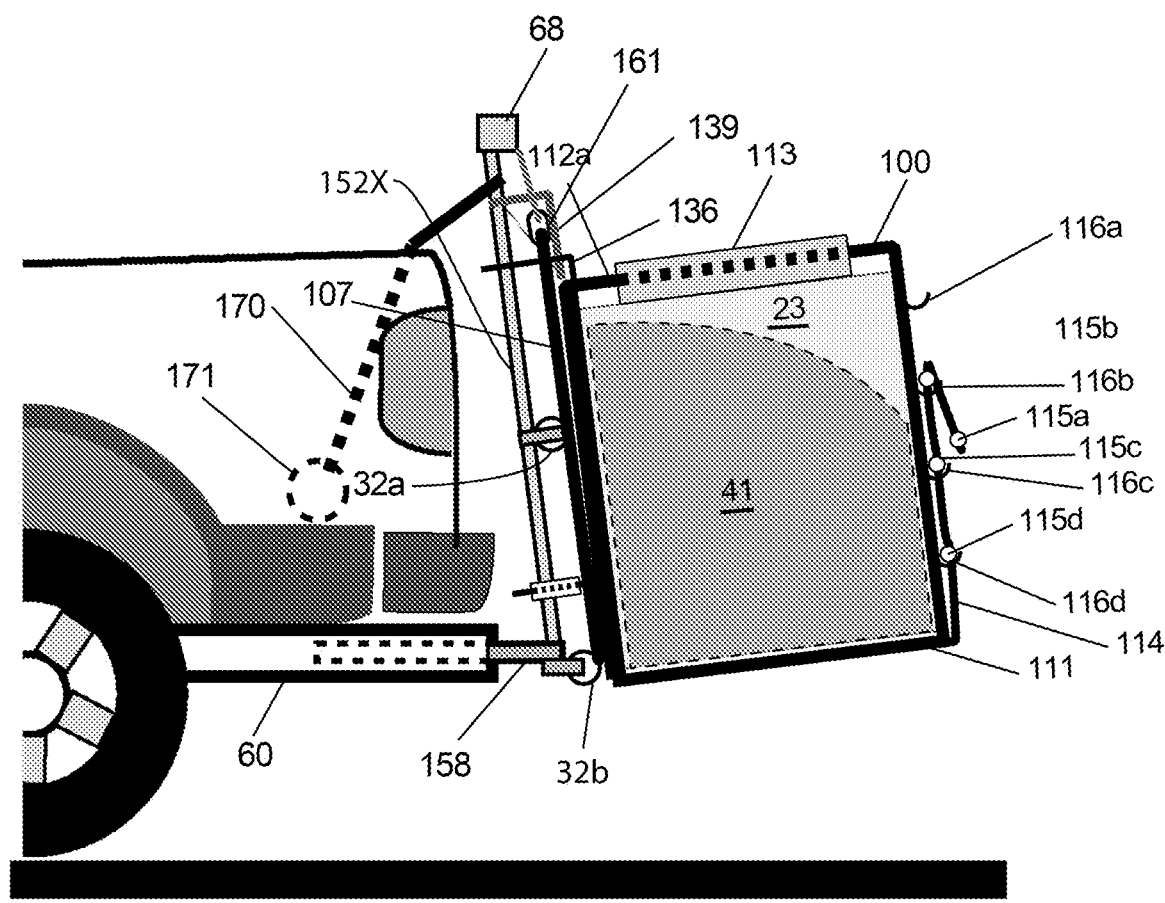
FIG. 16 is a side view of a lift frame with a container and frame attached to a pick up truck with a flap and anchor system partially reattached as loading of the container continues.
Figure 17:
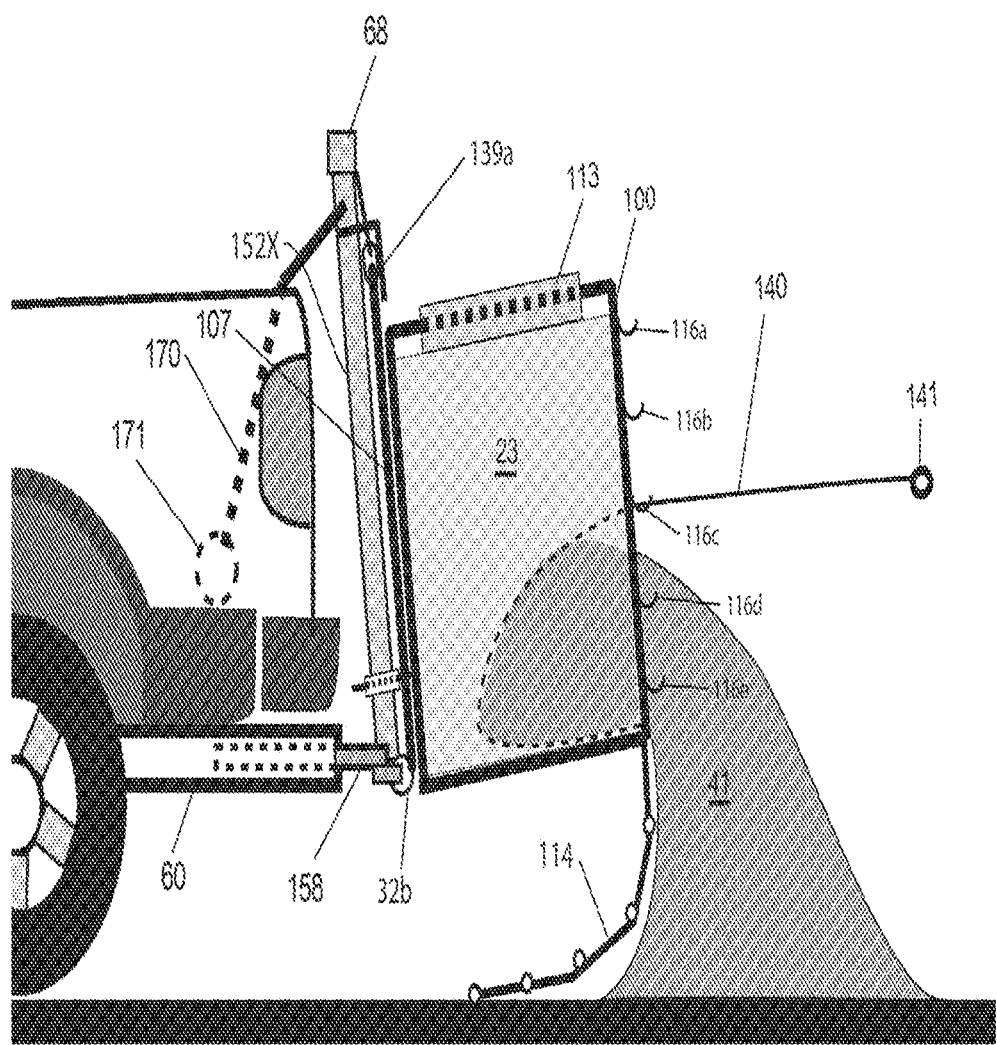
FIG. 17 is a side view of a lift frame with a container attached to a pick up truck with a flap and anchor system on the container unfastened for emptying a container via a cord and interior wall that can be pulled by the operator to assist in the discharge of materials inside the container.

FIGS. 14, 15, 16, and 17 are side views of bag frame 100 used with a flexible and/or fabric based container 23 secured to cargo frame 107 mounted on lift frame assembly 152X. In FIG. 14, container 23 is empty and shown with a wall panel 114 closed as wall panel supports 115a, 115b, 115c and 115d are engaged with wall panel anchors 116a, 116b, 116c and 116d respectively. In FIG. 15, container 23 is shown as being partially filled with bulk cargo 41, while a the container wall 114 has remained partially open to the bag frame 100 via the engagement of the wall panel support 115d to the wall panel anchor 116d. In this configuration, filling the container 23 is made easier for the operator not having to lift the bulk cargo 41 over the top of the bag frame 100. The container 23 may have an open top and/or a flap enclosure top. In FIG. 16, as the container 23 is filled with more bulk cargo 41, the wall panel 114 is further attached to the bag frame 100 via the engagement of additional wall panel supports 115c and 115b to the wall panel anchors 116c and 116b respectively as the bulk material 41 continues to rise in the container 23. In FIG. 17, the container 23 remains connected to the lift frame assembly 152X via the cargo frame 107 while the wall panel 114 has been completely opened for emptying the bulk materials 41. As shown, the final clean out of the bulk material 41 (yard waste) from the container 23 can be accomplished by the operator pulling on a dump liner handle 141 of a dump liner 140. The dump liner 140 may be attached to the cargo frame floor 111 near wall the panel anchor 116e and the wall panel anchor 116j (not shown).

Figure 18:
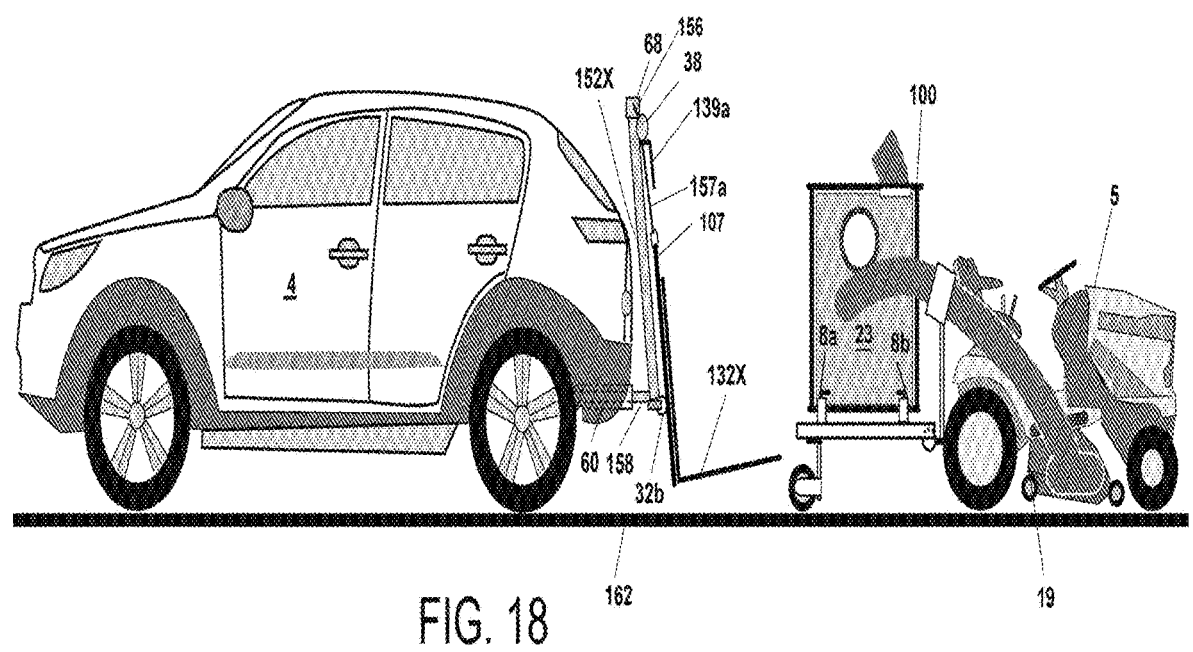
FIG. 18 is a side view of a lift frame attached to a pick up truck equipped with a set of forks attached to the lifting cables positioned close to the ground for in preparation of lifting a container of grass clippings from a cart attached to a lawnmower.
Figure 19:
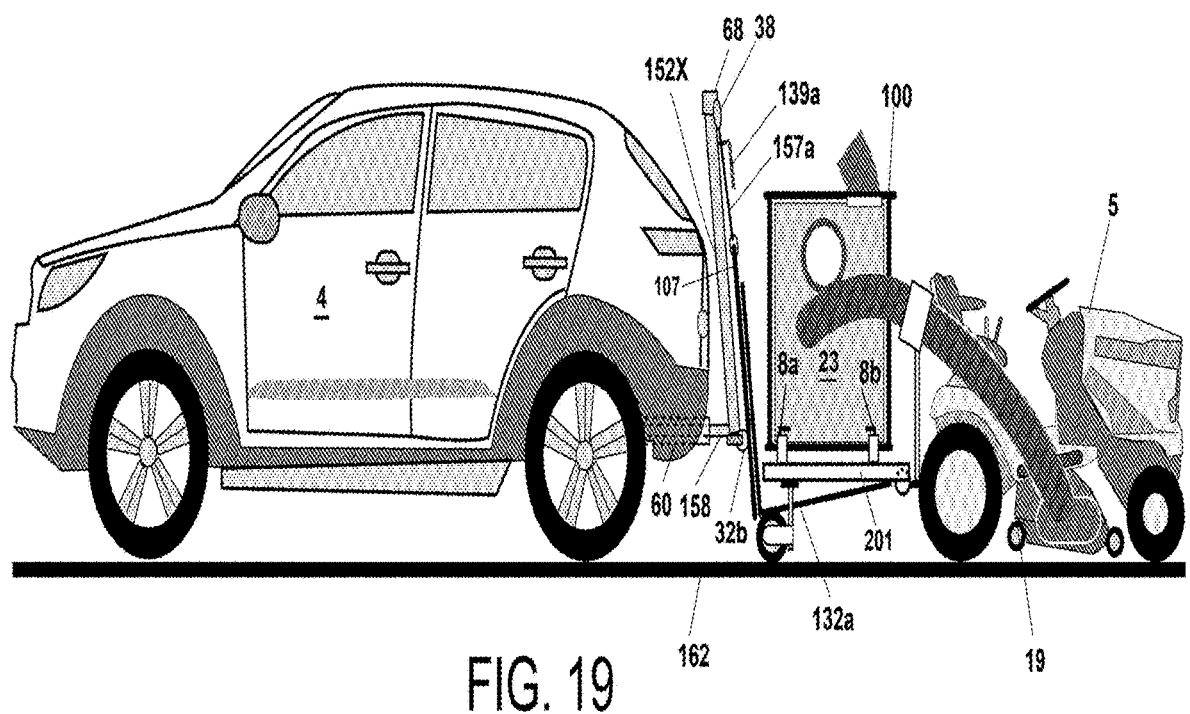
FIG. 19 is a side view of a lift frame attached to a vehicle with a set of forks attached to the cargo frame with the set of lifting forks placed directly under the container secured to a cart with locking pins while attached to a lawnmower.
Figure 20:
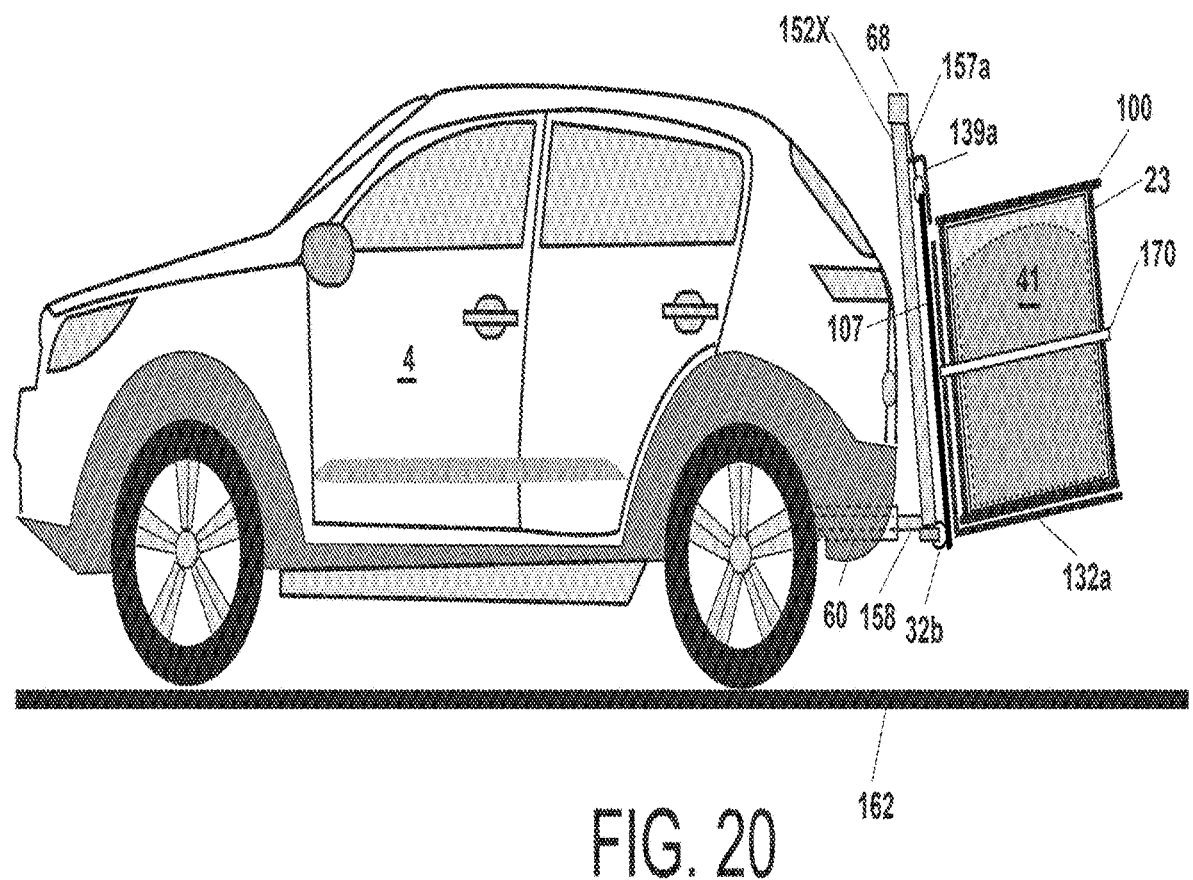
FIG. 20 is a side view of a lift frame attached to a vehicle after the container filled with grass clippings on the cart has been picked up for transport.
Figure 21:
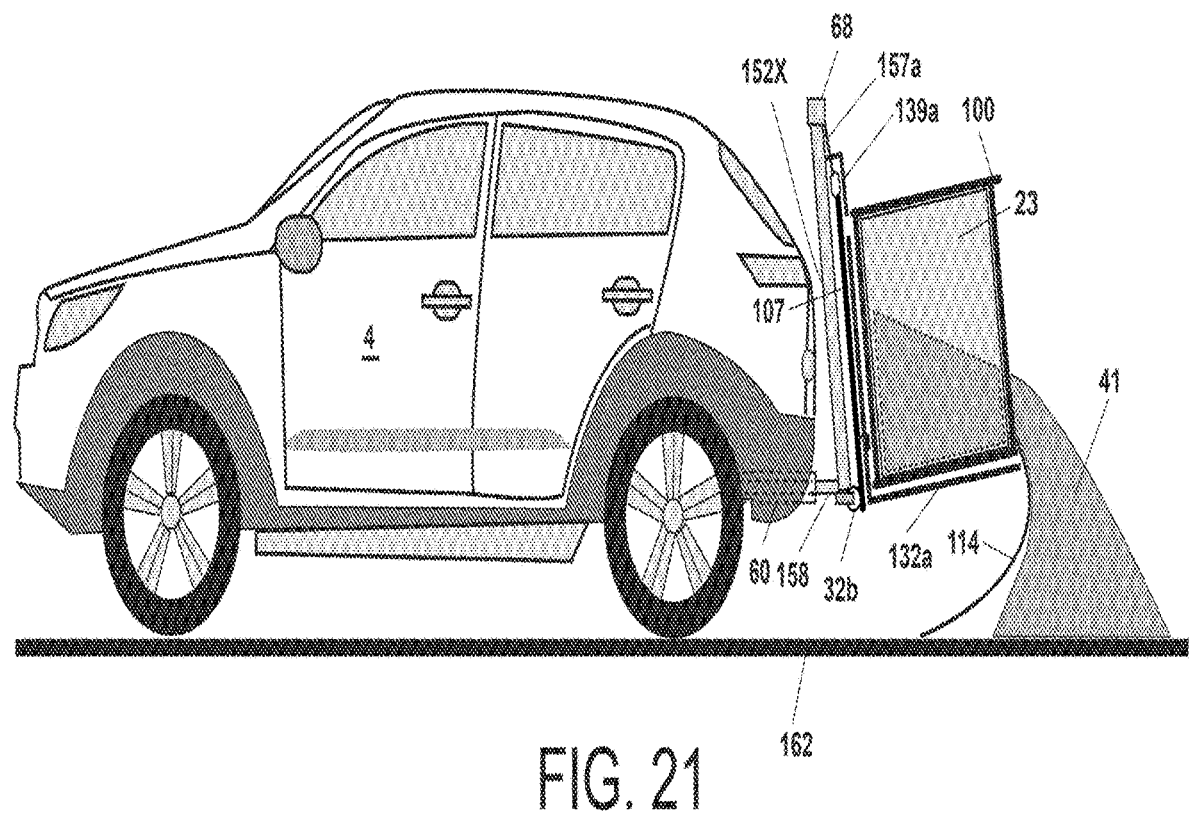
FIG. 21 is a side view of a lift frame assembly equipped with a lift fork assembly attached to a vehicle with the rear wall panel of the container opened for discharging the bulk material inside.

FIGS. 18, 19, 20 and 21 are side views of the cargo frame 107 equipped with a lift fork assembly 132X. In FIG. 18, a lift fork assembly 132X is attached to the cargo frame 107 for handling boxes, containers and other freight. In some applications, the fork lift frame assembly 136X can be mounted upside down on the cargo frame 107 for hauling bicycles and other equipment. In this configuration, lift fork assembly 132X is lifted and lowered via lift cables 157a and 157b (not shown) via the winch 68. In FIG. 19, vehicle 4 is parked and positioned to receive the container 23 attached to the bag frame 100 secured on mower cart 201 connected to lawnmower 5 via lock pins 8a, 8b and 8c and 8d (not shown). The container 23 is filled with grass clippings 130 (not shown), as well as other yard waste and probably a fair amount of ticks. Prior to transferring the container 23 that is filled with grass clippings 130 (not shown), lock pins 8a, 8b and 8c and 8d (not shown) are removed with lift forks 132a and 132b (not shown) underneath and ready to lift. In another configuration (not shown), the cargo frame 107 may be attached to the container 23 while on the cart 201 and then lifted off the cart via lift cables 157*a* and 157*b* (not shown) In FIG. 20, the container 23 and the bag frame 100 filled with bulk cargo 41 is supported via the lift forks 132*a* and 132*b* (not shown) on the cargo frame 107. As shown, once the lift forks 132*a* and 132*b* (not shown) are raised to the transport elevation on lift frame assembly 152X, a cargo strap 170 may be fastened around the container 23 to the lift fork assembly 132X for added security. In FIG. 21, the cargo strap 170 (not shown) has been removed allowing the rear wall 114 of the container 23 to be lowered so that the bulk cargo 41 can be emptied.

Figure 22:
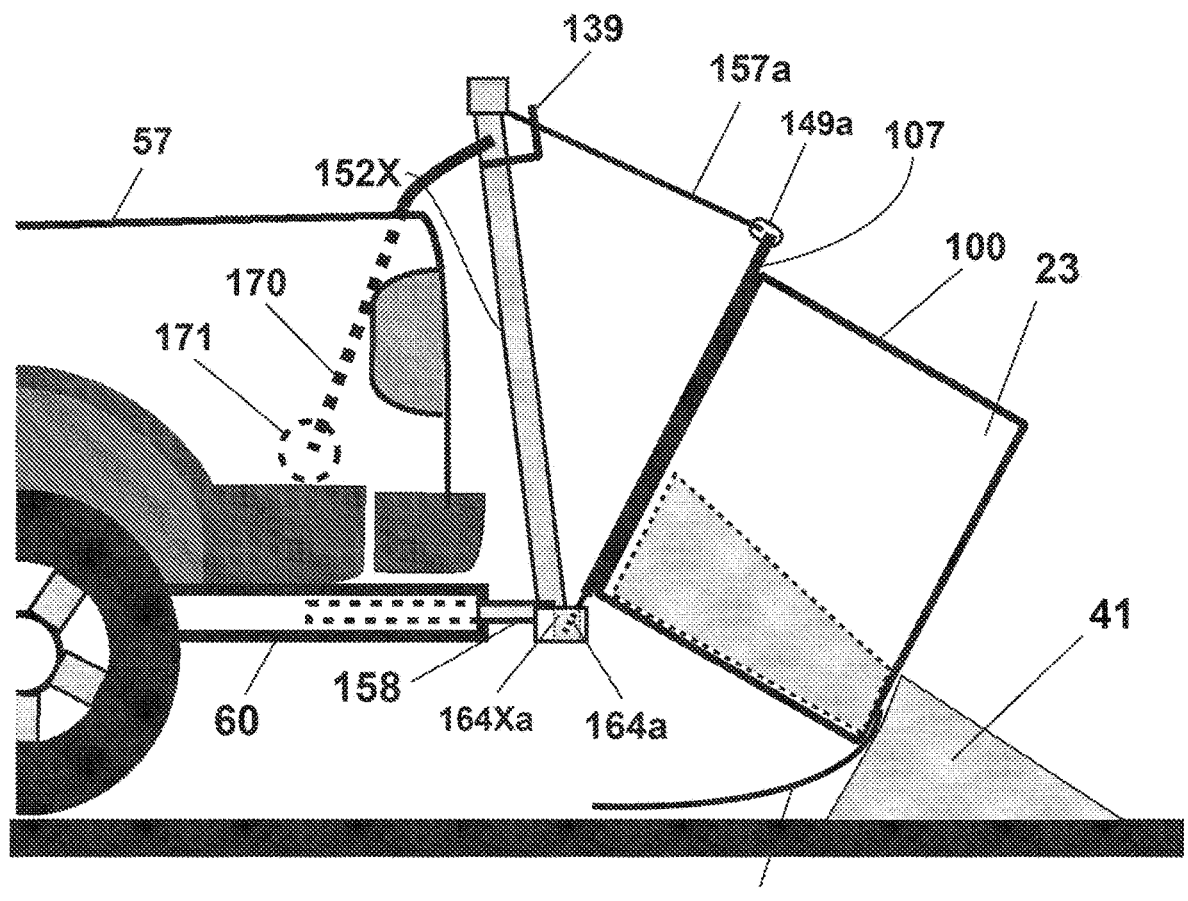
FIG. 22 is a side view of a container of grass clippings secured to a cargo frame that fits to the lift frame assembly that has been transported by a pick-up for emptying the container via a dumping action accomplished by extending the lift cables allowing the container to pivot backwards.

FIG. 22 is a side view of the lift frame assembly 152X secured to a pick-up truck 57. To provide extra support to the lift frame assembly 152X, the cargo frame 107, the container 23 and the bulk cargo 41 being handled and transported, the top of the lift frame assembly 152*x* is equipped with the cargo strap 170 to a truck bed anchor 171. As shown, once the safety 139*a* and 139*b* (not shown) are turned upward so as not to interfere with the pivoting movement of the top of the cargo frame 107, the lift cables 157*a* and 157*b* (not shown) are extended, the cargo frame 107 and the container 23 are allowed to pivot backwards via the lock studs 164*a* and 164*b* (not shown) being held in place via the lock stud holes 164X*a* and 164X*b*. With the wall panel 114 opened and lying underneath the container 23, the bulk material 41 inside the container 23 is able to be emptied.

Figure 23:
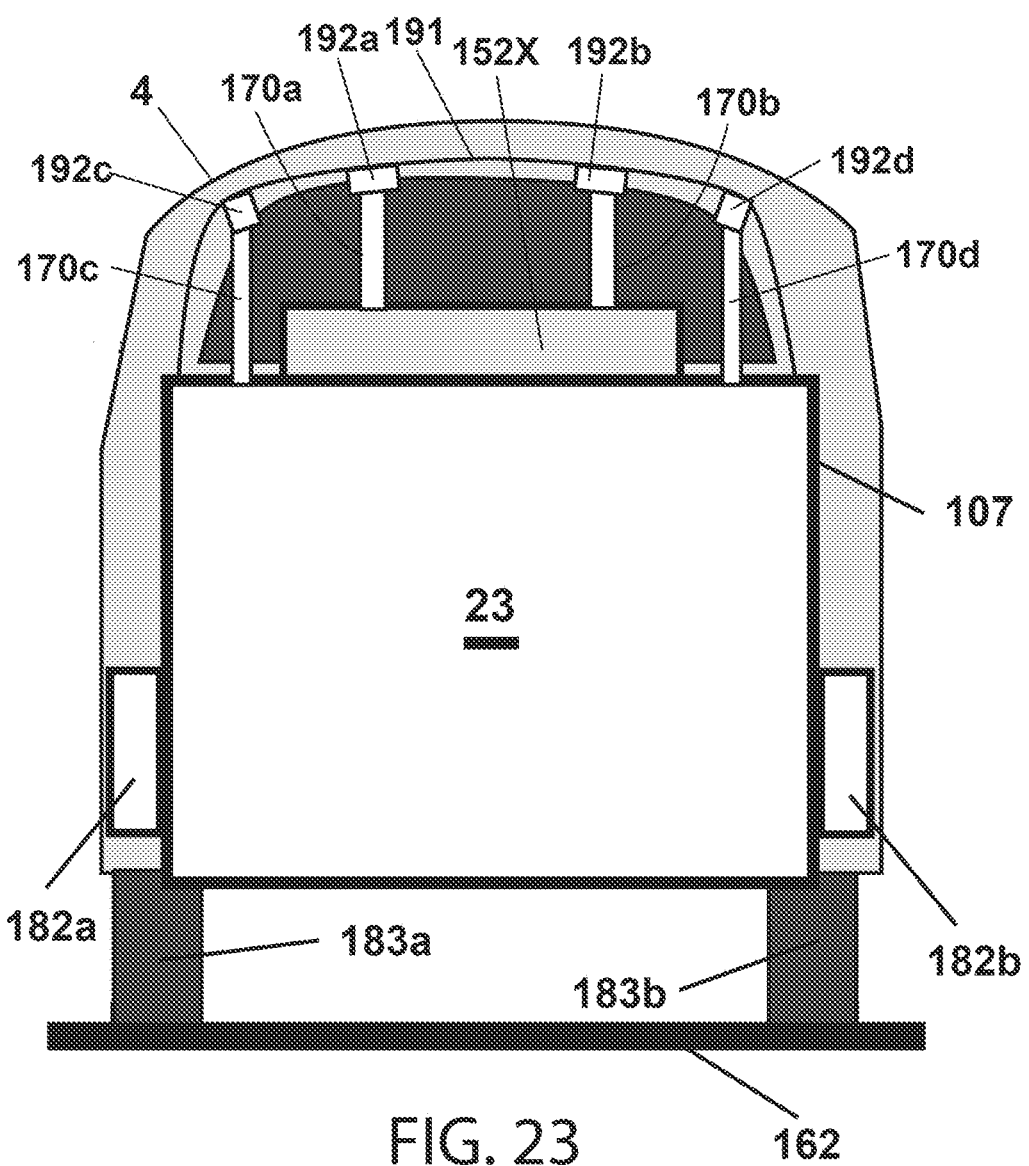
FIG. 23 is an end view of a vehicle equipped with a lift frame assembly transporting a wide container that uses a set of portable tail lights and extra cargo straps for extra support.

FIG. 23 is a an end view of a vehicle 4 equipped with the lift frame assembly 152X that is shown transporting the container 23, which is very wide and partially covering the tail lights (not shown) of vehicle 4. The tail lights 182*a* and 182*b* are portable and may be connected to control enclosure 189 (not shown) via electric cord (not shown). When not in use, tail lights 182*a* and 182*b* may be disconnected and stowed on lift rack assembly 152X. The trailer wiring harness 194 (not shown) of vehicle 4 that would normally be used control the lights on a trailer, is connected to control enclosure 189 (not shown) to provide the power and signals to tail lights 182*a* and 182*b*. As shown, to provide greater stability and support for transporting heavy and wide loads in container 23, cargo straps 170*a* and 170*b* are equipped with hatchback clips 192*a* and 192*b* that can be fastened between the lift frame assembly 152X and a hatchback edge 191 of the hatchback door. Another option is to attach the cargo straps 170*c* and 170*d* to a vehicle roof rack and/or to a length of tubing placed inside back hatch area of the vehicle (at the top or the bottom) with the cargo straps attached (not shown) and allowed to extend through the hatch seam to be connected to the lift frame (not shown). Springs (not shown) may be added to the cargo straps to absorb any rough jolts during transport.

Figure 24:
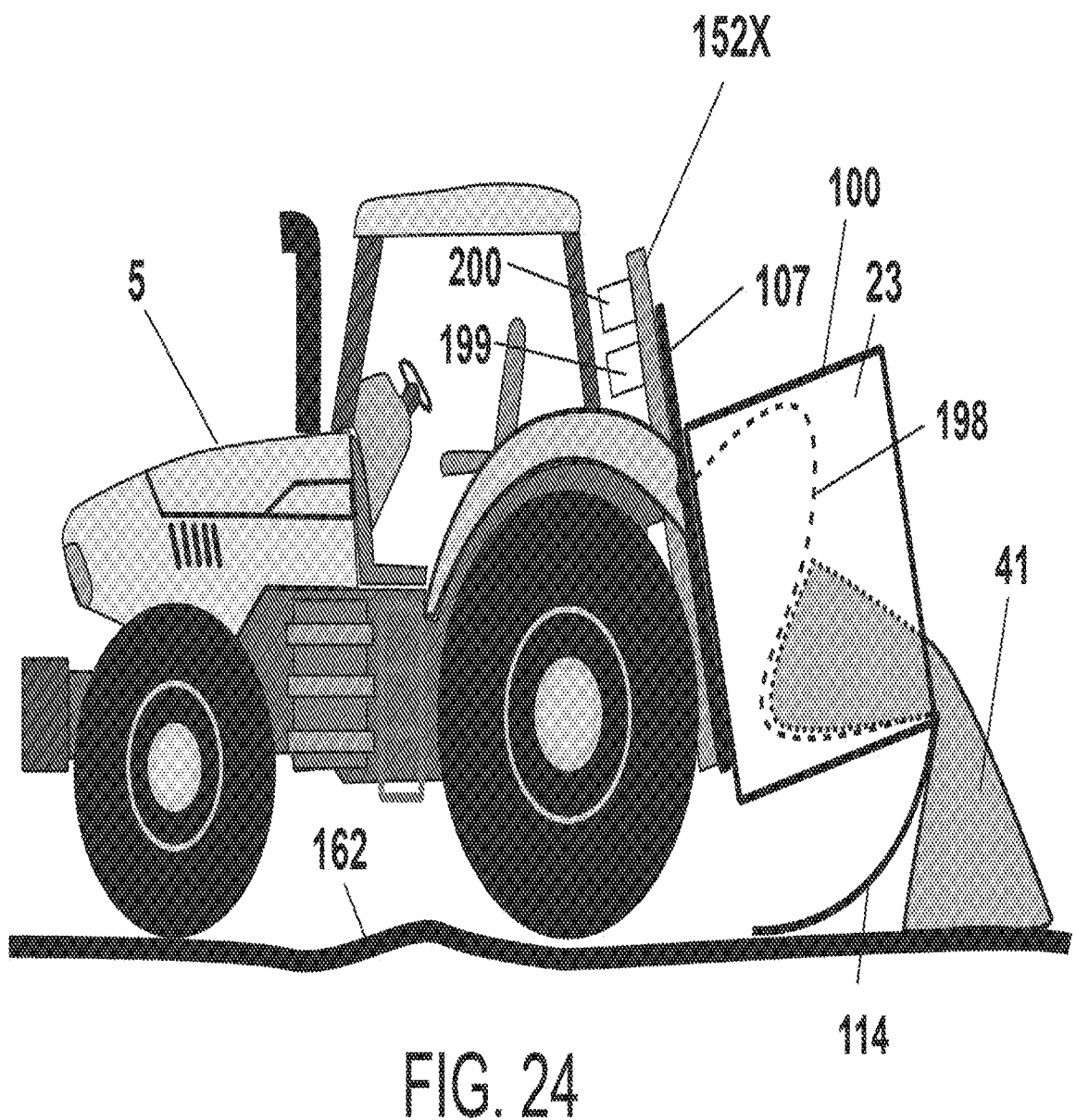
FIG. 24 is a side view of a lift frame assembly attached to the draw hitch of a tractor that is carrying a container of bulk material that is being discharged via an inflatable liner.

FIG. 24 is a side view of a tractor equipped with a lift frame assembly 152X attached to the tractor's draw hitch for transporting heavy loads, which includes the bulk material 41 such as dirt, salt, stone, feed. In this configuration for handling and emptying the bulk materials 41, the container 23 is made of a PVC coated fabric and equipped with an inflatable liner 198 made of a similar fabric. The lift frame assembly 152X is equipped with a power inverter (12V to 115V) and 115V vacuum blower for inflating the inflatable liner 197 via hose 202 (not shown) discharging the bulk material 41 from the container 23.

Figure 25:
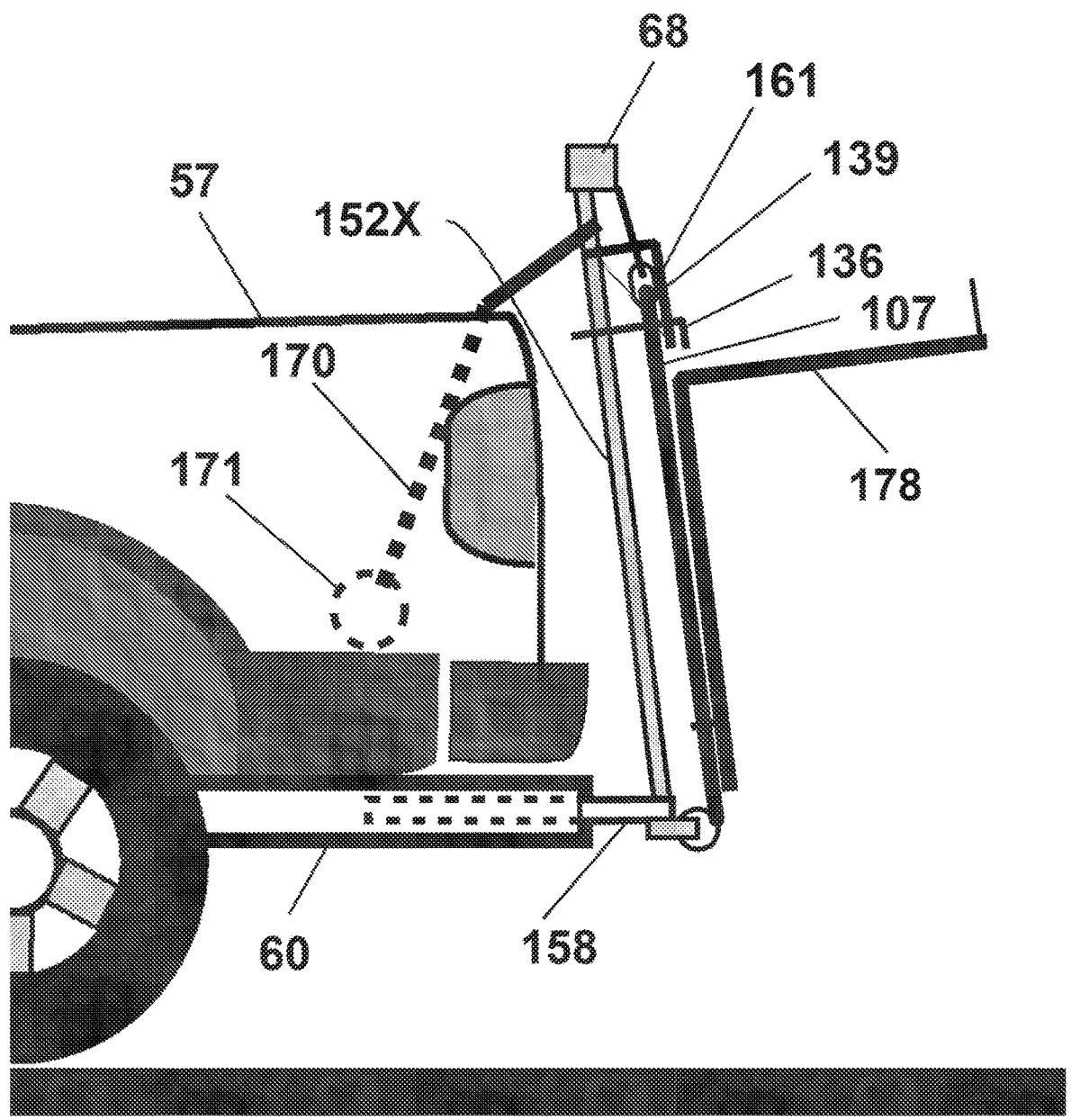
FIG. 25 is a side view of a lift frame assembly equipped with a set of forks (in an upside down position) for transporting bicycles and other items when attached to a pick-up truck.

FIG. 25 is a side view of the truck 57 with the lift frame assembly 152X attached whereby the cargo frame 107 is equipped with a bicycle rack 178. For this application and others, the cargo frame 107 can be fitted with the lift fork assembly 132X in an upside down position to function as a bicycle carrier.

Figure 26:
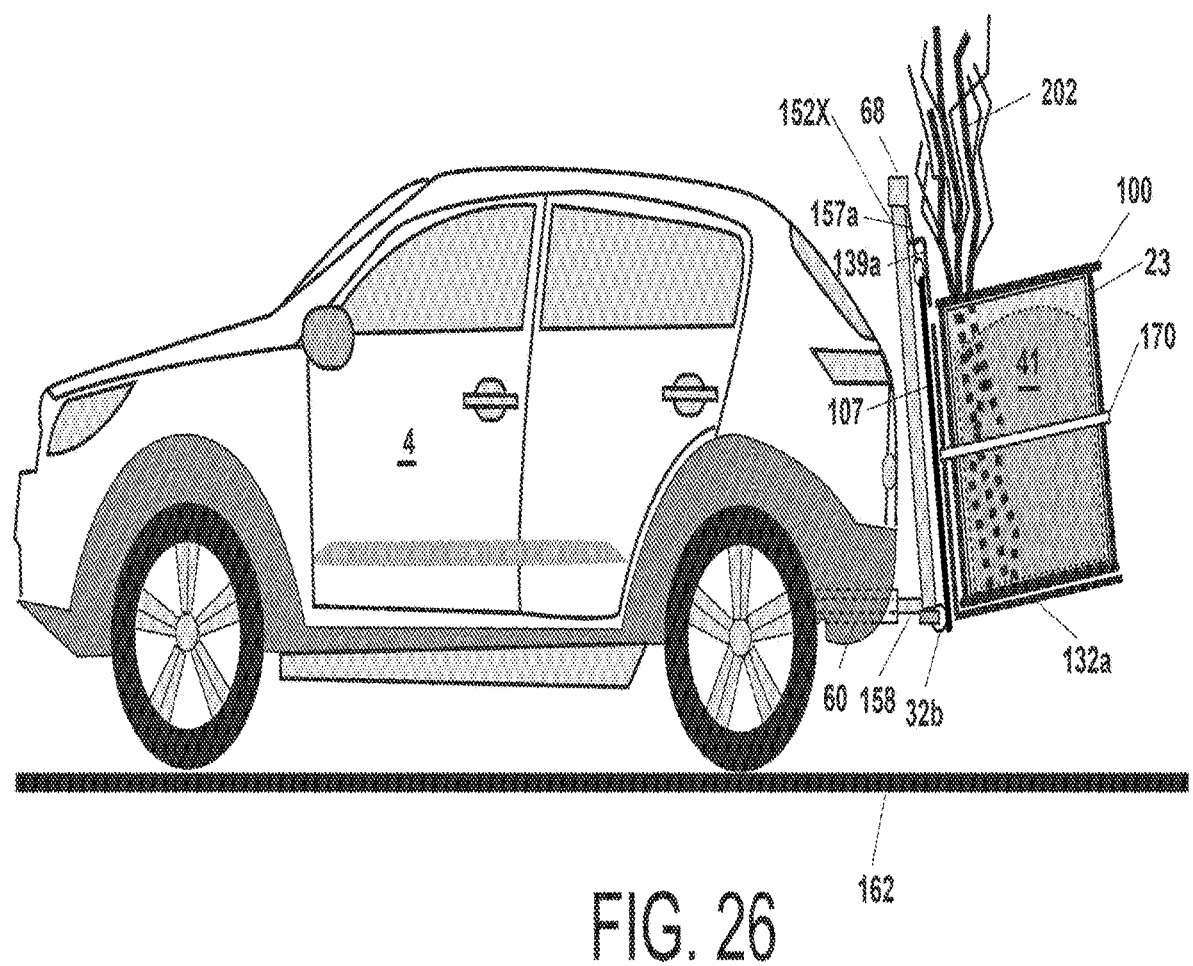
FIG. 26 is a side view of a vehicle equipped with a lift frame assembly hauling a cargo frame carrying a open top container filled with grass clippings, yard waste and tree branches.

FIG. 26 is a side view of a vehicle 4 equipped with the lift frame assembly 152X with a cargo frame 107 carrying an open top container 23 filled with bulk materials 41 such as grass clippings, other yard waste and debris and tree branches 202. In this use scenario, the cargo frame 107 and the container 23 (at 5 feet wide×2.5 feet deep and with a height of 4 feet) having a usable capacity of approximately 40 cubic feet can be placed in a homeowner's yard and filled as yard waste accumulates. With the container 23 having an open top, even tree branches 202 can be easily loaded, transported and then dumped at a disposal site. Because most residential and commercial properties have their lawns mowed and gardens maintained on a weekly basis, the container 23 is typically large enough to be filled and then quickly, safely and without any manual labor/lifting picked up onto the lift frame assembly 152X on the vehicle 4 and hauled away. In this configuration, container 23 may be used to transport surfboards, snowboards, ski's, shovels, rakes and most any other item that is relatively tall.

I claim:

1. A vehicle cargo rack assembly for transporting bulk materials and personal property mountable at a back end of a vehicle comprising:
    a lift frame assembly (152X), the lift frame assembly comprising:
        a tow bar tongue (158), the tow bar tongue configured to engage a tow bar bracket (60) provided on the back end of the vehicle (4, 57);
        one or more lift cables (157*a*, 157*b*); and
        a pulley system (154, 40, 43, 70, 169, and/or 155) guiding the one or more lift cables; and
        bottom safety bar assemblies (160*a*, 160*b*) rotatably secured to the lift frame base (151) and configured to swivel in and out;
    a cargo frame (107) configured to be lifted by the lift frame assembly;
    a container (23),
        the cargo frame configured to receive and secure the container;
        the container configured to transport bulk items and personal property within; and
    a lifting means comprising a winch (68) or a linear actuator (167), the lifting means attached to the lift frame assembly, the one or more of the lift cables, and the pulley system, the lifting means configured to lift the container for transportation.

2. The vehicle cargo rack assembly of claim 1 in which the lifting means is the linear actuator (167), the linear actuator disposed within a control enclosure (189) secured to the lift frame assembly (152X), the control enclosure comprising at least one of:
    a weight scale (38) with a scale display (37);
    a load cell (173) attached to the linear actuator and configured to read a load on the linear actuator, and programmed to automatically shut off the linear actuator (167) if an overload condition exists;
    a linear actuator extension (174);
    a battery (168);
    an up/down switch (175) controlling up and down movement of the lift frame assembly;
    a warning beeper (176);
    a power on/off switch (177);
    a motion sensor (179);
    a light sensor (180); and an alarm (181), the motion sensor and light sensor wired to the alarm, the alarm programmed to send a signal to a cell phone or a computer thereby sensing a problem with the cargo rack assembly or theft.

3. The vehicle cargo rack assembly of claim 1, the lift frame assembly (152X) further comprising:
a plurality of lift frame supports (152a, 152b, 151, 153) forming a planar framework, the framework forming an acute angle with the tow bar tongue (158) such that the framework tilts toward the back end of the vehicle (4, 5, 57) when the lift frame assembly is installed on the back end of the vehicle; and
rollers (32a, 32b, 132a, 132b) attached to the framework such that the cargo frame (107) rolls along the lift frame assembly (152X) when the lifting means is operated.

4. The vehicle cargo rack assembly of claim 3, further comprising a plurality of lock pins (165a-165d);
the framework further comprising a plurality of lift frame lock holes (150a-150d);
the cargo frame (107) further comprising a plurality of cargo frame lock holes (150Xa-150xd, 166c-166f) formed in alignment with the lift frame holes, whereby the lock pins lock the cargo bag frame in alignment with the lift frame when the container (23) is lifted for transportation.

5. The vehicle cargo rack assembly of claim 3,
the plurality of lift frame supports comprising a lift frame base (151) secured at a bottom end of the framework and secured to an end of the tow bar tongue (158);
the lift frame assembly (152X) further comprising a bottom roller frame (159) secured to the lift frame base (151), the bottom roller (32b, 132b) secured to the bottom roller frame (159).

6. The vehicle cargo rack assembly of claim 3, the cargo frame (107) comprising a lock stud (164) attached at a bottom end of, and parallel to, the cargo frame;
the plurality of lift frame supports comprising a lift frame base (151) secured at a bottom end of the framework and secured to an end of the tow bar tongue (158);
the lift frame base (151) comprising a lock hole (150e) formed in alignment with the lock stud (164) such the lock stud engages the lock hole to lock the cargo frame (107) securely for transportation.

7. The vehicle cargo rack assembly of claim 3, further comprising an L-shaped lift fork assembly (132) secured in a rolling relationship to the cargo frame (107) by the rollers (132a, 132b), the lift fork assembly configured to receive a container (23).

8. The vehicle cargo rack assembly of claim 7, wherein the lifting means is a winch (68).

9. The vehicle cargo rack assembly of claim 7, further comprising a bag frame (100) configured to be towed behind a lawn tractor (5), the container (23) securable within the bag frame, and the lift fork assembly (132) is configured to receive the bag frame.

10. The vehicle cargo rack assembly of claim 9, further comprising cargo frame locks (136a, 136b) for securing the bag frame (100) to the lift frame assembly (152X).

11. The vehicle cargo rack assembly of claim 7, the container (23) comprising a flexible container wall (114) on an outer vertical side thereof.

12. The vehicle cargo rack assembly of claim 1, the lift frame assembly (152X) further comprising cargo frame locks (136a, 136b) that hold the cargo frame (107) securely to the lift frame assembly (152X) during transport.

13. The vehicle cargo rack assembly of claim 1, further comprising wheels (144a-144d) secured to a bottom of the container (23).

14. The vehicle cargo rack assembly of claim 1, the lift frame assembly (152x) further comprising a pair of safety flanges (139a, 139b) that are configured to prevent the cargo frame (107) from moving backwards or from side to side.

15. The vehicle cargo rack assembly of claim 1, the container (23) being made from a substantially rigid and weather proof material selected from the group consisting of fiberglass, metal, plastic, wood, and PVC coated fabric.

16. The vehicle cargo rack assembly of claim 1, further comprising cable fasteners (149a, 149b) secured to ends of the one or more of the lift cables (157a, 157b),
the cargo frame (107) further comprising lift holes (163a, 163b) at an upper end of the cargo frame,
the cable fasteners removably securable to the lift holes.

17. The vehicle cargo rack assembly of claim 1, further comprising:
a bag frame (100) securable to the cargo frame (107), the bag frame comprising a plurality of wall panel anchors (116a-116d) on an outer vertical side thereof in a spaced relationship;
the container (23) disposed within the bag frame, the container comprising a flexible container wall (114) on an outer vertical side thereof;
the container wall comprising a plurality of wall panel supports (115a-115d) in a spaced relationship corresponding to the wall panel anchors; and
the wall panel anchors designed to receive and hold respective corresponding wall panel supports (115a-115d) to selectively maintain the wall panel (114) in a closed position, partially open position, or fully open position.

18. The vehicle cargo rack assembly of claim 17, further comprising a flexible dump liner (140) secured adjacent a location where the wall panel (114) is secured for facilitating emptying the container (23) the when the wall panel is in an open position.

19. The vehicle cargo rack assembly of claim 18, the dump liner (140) comprising a dump liner handle (141).

20. The vehicle cargo rack assembly of claim 1, wherein the vehicle is a pickup truck (57), and further comprising a cargo strap (170) connected at one end to the lift frame assembly (152X) and connected at another end to a truck bed anchor (171) provided on the pickup truck.

21. The vehicle cargo rack assembly of claim 1, further comprising a weight scale (38) secured in line with the one or more of the lift cables (157a, 157b).

22. The vehicle cargo rack assembly of claim 1, further comprising
removable vehicle tail lights (182a, 182b) in electrical communication with the control enclosure (189);
a plurality of cargo straps (170a-170d) secured to the lift frame assembly (152X); and
a plurality of hatchback clips (192a-192d) secured to a respective cargo strap and attachable to a hatchback edge (191) of the vehicle.

23. A vehicle cargo rack assembly for transporting bulk materials and personal property mountable at a back end of a vehicle comprising:
a lift frame assembly (152X), the lift frame assembly comprising:
a tow bar tongue (158), the tow bar tongue configured to engage a tow bar bracket (60) provided on the back end of the vehicle (4, 57);
one or more lift cables (157a, 157b); and a pulley system (154, 40, 43, 70, 169, and/or 155) guiding the one or more lift cables;
a plurality of lift frame supports (152a, 152b, 151, 153) forming a planar framework, the framework forming an acute angle with the tow bar tongue (158) such that the framework tilts toward the back end of the vehicle (4, 5, 57) when the lift frame assembly is installed on the back end of the vehicle;
the plurality of lift frame supports comprising a lift frame base (151) secured at a bottom end of the framework and secured to an end of the tow bar tongue (158);
rollers (32a, 32b, 132a, 132b) attached to the framework such that a cargo frame (107) rolls along the lift frame assembly (152X) when the lifting means is operated; and
a bottom roller frame (159) secured to the lift frame base (151), the bottom roller (32b, 132b) secured to the bottom roller frame (159);
the cargo frame (107) configured to be lifted by the lift frame assembly;
a container (23),
the cargo frame configured to receive and secure the container,
the container configured to transport bulk items and personal property within; and
a lifting means comprising a winch (68) or a linear actuator (167), the lifting means attached to the lift frame assembly, the one or more lift cables, and the pulley system, the lifting means configured to lift the container for transportation.

24. A vehicle cargo rack assembly for transporting bulk materials and personal property mountable at a back end of a vehicle comprising:
a lift frame assembly (152X), the lift frame assembly comprising:
a tow bar tongue (158), the tow bar tongue configured to engage a tow bar bracket (60) provided on the back end of the vehicle (4, 57);
one or more lift cables (157a, 157b); and
a pulley system (154, 40, 43, 70, 169, and/or 155) guiding the one or more lift cables;
a plurality of lift frame supports (152a, 152b, 151, 153) forming a planar framework, the framework forming an acute angle with the tow bar tongue (158) such that the framework tilts toward the back end of the vehicle (4, 5, 57) when the lift frame assembly is installed on the back end of the vehicle;
the plurality of lift frame supports comprising a lift frame base (151) secured at a bottom end of the framework and secured to an end of the tow bar tongue (158);
the lift frame base (151) comprising a lock hole (150e) formed in alignment with a lock stud (164) such the lock stud engages the lock hole to lock a cargo frame (107) securely for transportation; and
rollers (32a, 32b, 132a, 132b) attached to the framework such that the cargo frame (107) rolls along the lift frame assembly (152X) when the lifting means is operated;
the cargo frame (107) configured to be lifted by the lift frame assembly;
the cargo frame (107) comprising the lock stud (164) attached at a bottom end of, and parallel to, the cargo frame;
a container (23),
the cargo frame configured to receive and secure the container,
the container configured to transport bulk items and personal property within; and
a lifting means comprising a winch (68) or a linear actuator (167), the lifting means attached to the lift frame assembly, the one or more lift cables, and the pulley system, the lifting means configured to lift the container for transportation.

25. A vehicle cargo rack assembly for transporting bulk materials and personal property mountable at a back end of a vehicle comprising:
a lift frame assembly (152X), the lift frame assembly comprising:
a tow bar tongue (158), the tow bar tongue configured to engage a tow bar bracket (60) provided on the back end of the vehicle (4, 57);
one or more lift cables (157a, 157b); and
a pulley system (154, 40, 43, 70, 169, and/or 155) guiding the one or more lift cables; and
a pair of safety flanges (139a, 139b) that are configured to prevent a cargo frame (107) from moving backwards or from side to side;
the cargo frame (107) configured to be lifted by the lift frame assembly;
a container (23),
the cargo frame configured to receive and secure the container,
the container configured to transport bulk items and personal property within; and
a lifting means comprising a winch (68) or a linear actuator (167), the lifting means attached to the lift frame assembly, the one or more lift cables, and the pulley system, the lifting means configured to lift the container for transportation.

26. A vehicle cargo rack assembly for transporting bulk materials and personal property mountable at a back end of a vehicle comprising:
a lift frame assembly (152X), the lift frame assembly comprising:
a tow bar tongue (158), the tow bar tongue configured to engage a tow bar bracket (60) provided on the back end of the vehicle (4, 57);
one or more lift cables (157a, 157b); and
a pulley system (154, 40, 43, 70, 169, and/or 155) guiding the one or more lift cables;
a cargo frame (107) configured to be lifted by the lift frame assembly;
a container (23),
the cargo frame configured to receive and secure the container,
the container configured to transport bulk items and personal property within; and
a lifting means comprising a winch (68) or a linear actuator (167), the lifting means attached to the lift frame assembly, the one or more lift cables, and the pulley system, the lifting means configured to lift the container for transportation;
a bag frame (100) securable to the cargo frame (107), the bag frame comprising a plurality of wall panel anchors (116a-116d) on an outer vertical side thereof in a spaced relationship;
the container (23) disposed within the bag frame, the container comprising a flexible container wall (114) on an outer vertical side thereof;

the container wall comprising a plurality of wall panel supports (115a-115d) in a spaced relationship corresponding to the wall panel anchors; and the wall panel anchors designed to receive and hold respective corresponding wall panel supports (115a-115d) to selectively maintain the wall panel (114) in a closed position, partially open position, or fully open position.

27. A vehicle cargo rack assembly for transporting bulk materials and personal property mountable at a back end of a vehicle comprising:

a lift frame assembly (152X), the lift frame assembly comprising:

a tow bar tongue (158), the tow bar tongue configured to engage a tow bar bracket (60) provided on the back end of the vehicle (4, 57);

one or more lift cables (157a, 157b); and a pulley system (154, 40, 43, 70, 169, and/or 155) guiding the one or more lift cables;

a plurality of lift frame supports (152a, 152b, 151, 153) forming a planar framework, the framework forming an acute angle with the tow bar tongue (158) such that the framework tilts toward the back end of the vehicle (4, 5, 57) when the lift frame assembly is installed on the back end of the vehicle; and rollers (32a, 32b, 132a, 132b) attached to the framework such that a cargo frame (107) rolls along the lift frame assembly (152X) when the lifting means is operated;

the cargo frame (107) configured to be lifted by the lift frame assembly;

an L-shaped lift fork assembly (132) secured in a rolling relationship to the cargo frame (107) by the rollers (132a, 132b), the lift fork assembly configured to receive a container (23);

the cargo frame configured to receive and secure the container, the container configured to transport bulk items and personal property within;

a lifting means comprising a winch (68) or a linear actuator (167), the lifting means attached to the lift frame assembly, the one or more lift cables, and the pulley system, the lifting means configured to lift the container for transportation; and a bag frame (100) configured to be towed behind a lawn tractor (5), the container (23) securable within the bag frame, and the lift fork assembly (132) is configured to receive the bag frame.

28. A vehicle cargo rack assembly for transporting bulk materials and personal property mountable at a back end of a vehicle comprising:

a lift frame assembly (152X), the lift frame assembly comprising:

a tow bar tongue (158), the tow bar tongue configured to engage a tow bar bracket (60) provided on the back end of the vehicle (4, 57);

one or more lift cables (157a, 157b); and a pulley system (154, 40, 43, 70, 169, and/or 155) guiding the one or more lift cables;

a cargo frame (107) configured to be lifted by the lift frame assembly;

a container (23), the cargo frame configured to receive and secure the container, the container configured to transport bulk items and personal property within;

a lifting means comprising a winch (68) or a linear actuator (167), the lifting means attached to the lift frame assembly, the one or more of the lift cables, and the pulley system, the lifting means configured to lift the container for transportation;

removable vehicle tail lights (182a, 182b) in electrical communication with a control enclosure (189);

a plurality of cargo straps (170a-170d) secured to the lift frame assembly (152X); and a plurality of hatchback clips (192a-192d) secured to a respective cargo strap and attachable to a hatchback edge (191) of the vehicle.

29. A vehicle cargo system for transporting bulk materials and personal property mountable at a back end of a vehicle comprising:

a lift frame assembly (152X), the lift frame assembly comprising:

a tow bar tongue (158), the tow bar tongue configured to engage a tow bar bracket (60) provided on the back end of the vehicle (4, 57);

one or more lift cables (157a, 157b); and a pulley system (154, 40, 43, 70, 169, and/or 155) guiding the one or more lift cables;

a cargo frame (107) configured to be lifted by the lift frame assembly;

a container (23), the cargo frame configured to receive and secure the container, the container configured to transport bulk items and personal property within; and a lifting means comprising a winch (68) or a linear actuator (167), the lifting means attached to the lift frame assembly, the one or more lift cables, and the pulley system, the lifting means configured to lift the container for transportation;

the lift frame assembly (152X) further comprising:

a plurality of lift frame supports (152a, 152b, 151, 153) forming a planar framework, the framework forming an acute angle with the tow bar tongue (158) such that the framework tilts toward the back end of the vehicle (4, 5, 57) when the lift frame assembly is installed on the back end of the vehicle; and rollers (32a, 32b) attached to the framework such that the cargo frame (107) rolls along the lift frame assembly (152X) when the lifting means is operated;

the cargo frame (107) comprising at least one lock stud (164a, 164b) attached at a bottom end of, and parallel to, the cargo frame;

the plurality of lift frame supports comprising a lift frame base (151) secured at a bottom end of the framework and secured to an end of the tow bar tongue (158);

the lift frame base (151) comprising at least one lock hole (164Xa, 164Xb) formed in alignment with the lock stud such that the lock stud engages the lock hole to lock the cargo frame (107) securely for transportation or to pivot the container (23) when the container is tipped.

* * * * *